United States Patent
Suzuki et al.

(10) Patent No.: US 11,699,052 B2
(45) Date of Patent: Jul. 11, 2023

(54) BEARING COMPONENT, BEARING, MACHINE, VEHICLE, INDIVIDUAL IDENTIFICATION METHOD FOR BEARING COMPONENT, MANUFACTURING METHOD FOR BEARING, MANUFACTURING METHOD FOR MACHINE, AND MANUFACTURING METHOD FOR VEHICLE

(71) Applicant: NSK LTD., Tokyo (JP)

(72) Inventors: Satoru Suzuki, Fujisawa (JP); Asahi Saito, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/424,355

(22) PCT Filed: Jan. 14, 2020

(86) PCT No.: PCT/JP2020/000836
§ 371 (c)(1),
(2) Date: Jul. 20, 2021

(87) PCT Pub. No.: WO2020/158367
PCT Pub. Date: Aug. 6, 2020

(65) Prior Publication Data
US 2022/0114353 A1    Apr. 14, 2022

(30) Foreign Application Priority Data
Jan. 28, 2019    (JP) ................................. 2019-012189

(51) Int. Cl.
*G06K 7/14*    (2006.01)
*F16C 41/00*    (2006.01)
*G06K 19/06*    (2006.01)

(52) U.S. Cl.
CPC .......... *G06K 7/1417* (2013.01); *F16C 41/008* (2013.01); *G06K 19/06037* (2013.01)

(58) Field of Classification Search
CPC ....... G06K 19/06028; G06K 19/06037; G06K 7/1417; F16C 41/008
See application file for complete search history.

(56) References Cited

U.S. PATENT DOCUMENTS

| | | |
|---|---|---|
| 2009/0304318 A1 | 12/2009 | Konno et al. |
| 2014/0020250 A1 | 1/2014 | Labelle et al. |

(Continued)

FOREIGN PATENT DOCUMENTS

| | | |
|---|---|---|
| EP | 2829757 A1 | 1/2015 |
| EP | 2840168 A2 | 2/2015 |

(Continued)

OTHER PUBLICATIONS

International Search Report (PCT/ISA/210) dated Mar. 17, 2020 issued by the International Searching Authority in International Application No. PCT/JP2020/000836.

(Continued)

*Primary Examiner* — Laura A Gudorf
(74) *Attorney, Agent, or Firm* — Sughrue Mion, PLLC

(57) ABSTRACT

A bearing component is an annular member with a two-dimensional code which has a shape with a maximum circumferential dimension longer than a maximum radial dimension or a maximum axial dimension. An individual identification method for the bearing component includes the steps of imaging while rotating the bearing component, detecting a line pattern of the two-dimensional code from a captured image, recognizing the two-dimensional code based on an extension direction of the line pattern, extracting corresponding registration information by referring to a database based on information of the two-dimensional code, (Continued)

and identifying the bearing component according to the extracted registration information.

22 Claims, 12 Drawing Sheets

(56) References Cited

U.S. PATENT DOCUMENTS

| | | |
|---|---|---|
| 2018/0276623 A1 | 9/2018 | Pausch et al. |
| 2020/0171736 A1* | 6/2020 | Auger .................... B29C 49/48 |

FOREIGN PATENT DOCUMENTS

| | | |
|---|---|---|
| GB | 2521391 A | 6/2015 |
| JP | 2006-342870 A | 12/2006 |
| JP | 2011-240857 A | 12/2011 |
| JP | 2015-64091 A | 4/2015 |
| JP | 2015-64092 A | 4/2015 |

OTHER PUBLICATIONS

Written Opinion (PCT/ISA/237) dated Mar. 17, 2020 issued by the International Searching Authority in International Application No. PCT/JP2020/000836.

Li Xinping, "Introduction to Internet of Things Education Engineering", Huazhong University of Science and Technology, 2016, 14 pages.

Office Action issued Feb. 22, 2023 by the National Intellectual Property Administration, PRC in corresponding Chinese Application No. 202080006335.8.

* cited by examiner

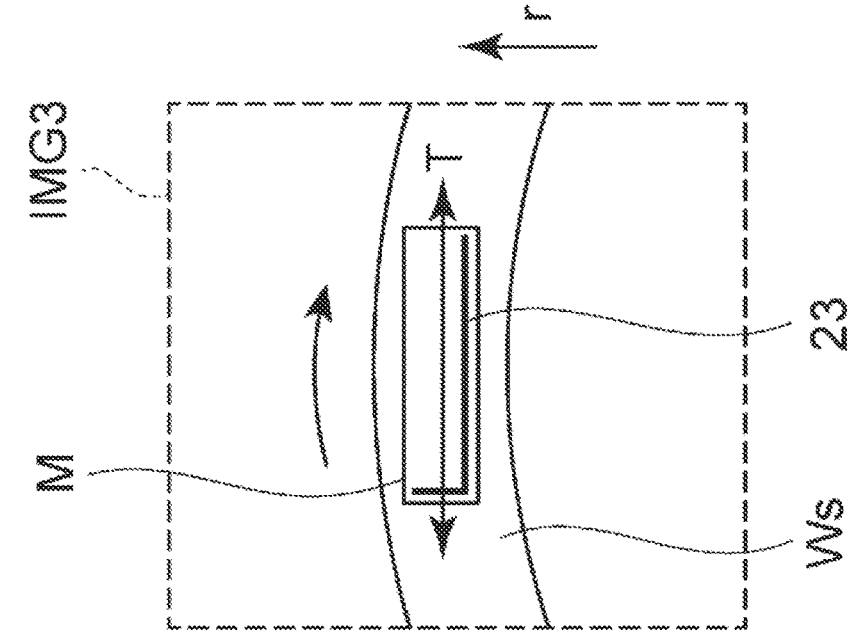
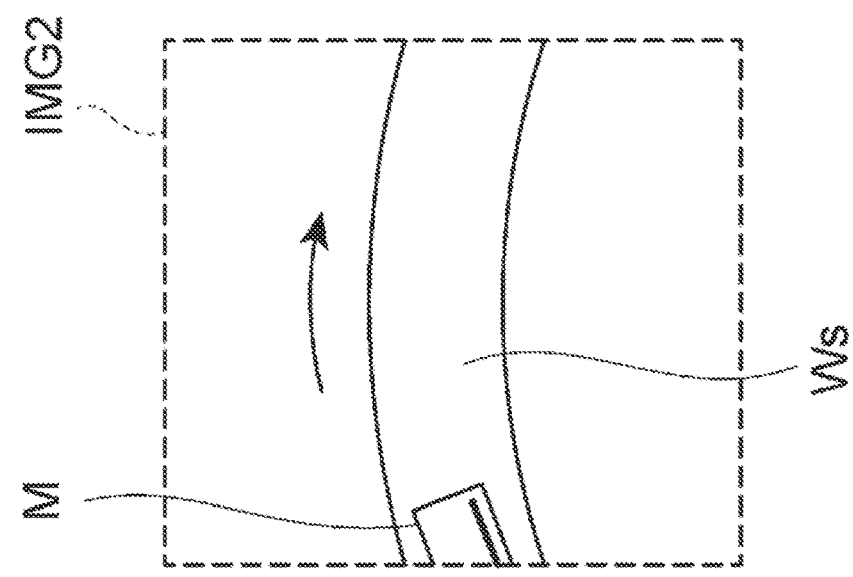
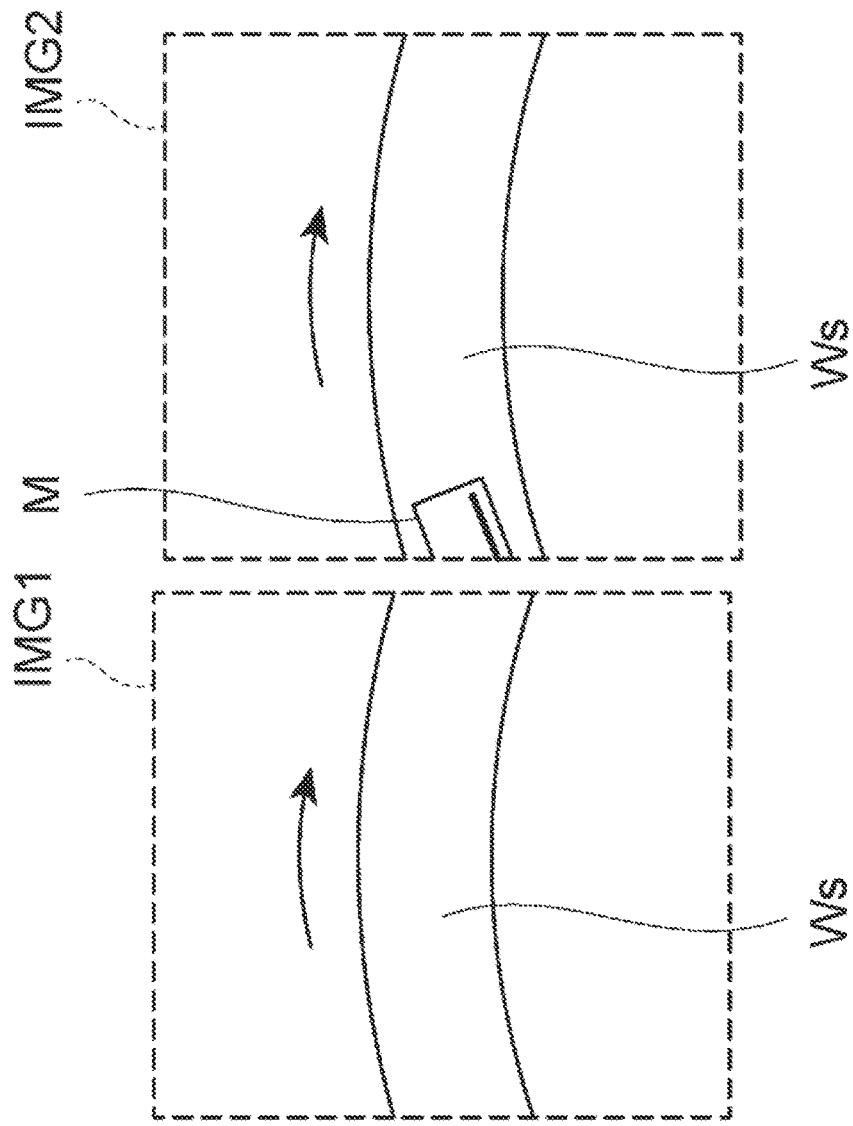

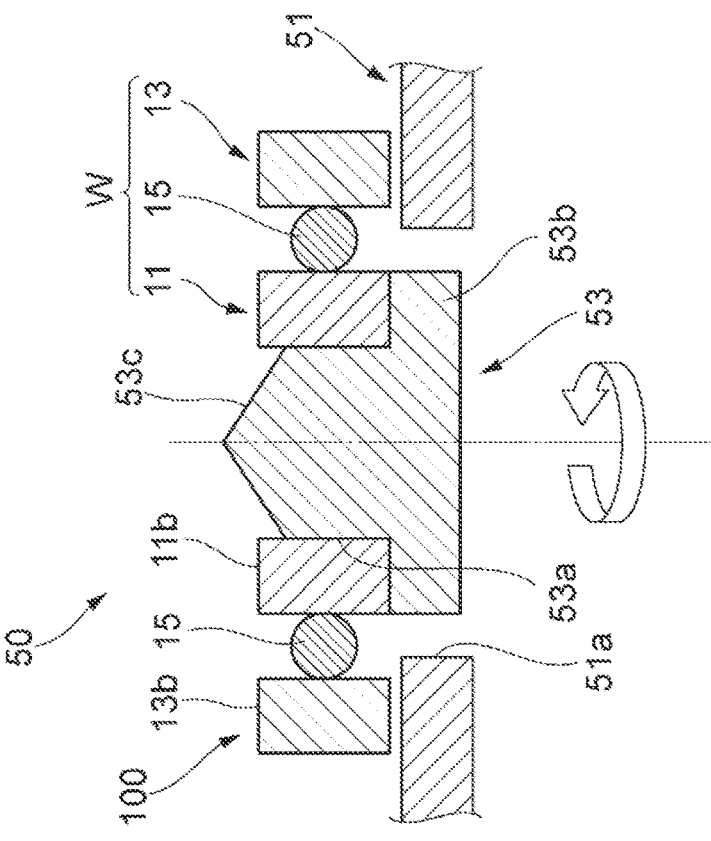
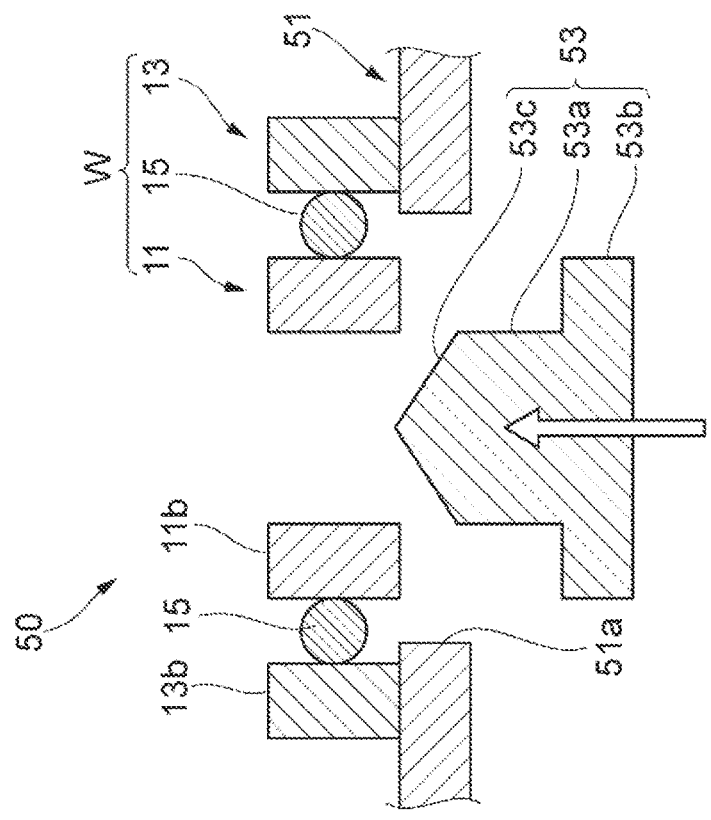

BEARING COMPONENT, BEARING, MACHINE, VEHICLE, INDIVIDUAL IDENTIFICATION METHOD FOR BEARING COMPONENT, MANUFACTURING METHOD FOR BEARING, MANUFACTURING METHOD FOR MACHINE, AND MANUFACTURING METHOD FOR VEHICLE

TECHNICAL FIELD

The present invention relates to a bearing component, a bearing, a machine, a vehicle, an individual identification method of a bearing component, a bearing manufacturing method, a machine manufacturing method, and a vehicle manufacturing method.

BACKGROUND ART

A technique is known in which information such as an identification number is retained in each product or part for the purpose of making it possible to trace a process of product production, processing, and distribution to the market and improving quality. For example, JP-A-2011-240857 (Patent Document 1) discloses a bearing engraved with a character string representing a product model number, a date of manufacture, and the like.

In a bearing of Patent Document 1, information such as a model number of a product and a date of manufacture is engraved on a bearing end surface or the like by laser marking. Accordingly, a management of a bearing after shipment is facilitated. For example, even when a bearing is returned from the market due to a defect, information about the bearing can be easily confirmed from the marked information.

PRIOR ART DOCUMENT

Patent Document

Patent Document 1: JP-A-2011-240857

SUMMARY OF INVENTION

Technical Problem

However, in a technique of Patent Literature 1, character string information such as numbers and English characters indicating the model number, date of manufacture, and the like of the product is engraved on an end surface of the bearing. While it is easy to visually check the character string information, there is a disadvantage that reading errors are likely to occur in automatic reading by an optical reading device or the like. Small bearings and thin bearings have a small engraving space, which limits the number of digits that can be recorded in the character string. Therefore, it is difficult to cope with an increase in the amount of information to be recorded and there are many problems to give individual identification information to all bearing components (inner ring, outer ring, and the like) of mass-produced bearings.

An object of the invention is to provide a bearing component, a bearing, a machine, a vehicle, an individual identification method of a bearing component, a bearing manufacturing method, a machine manufacturing method, and a vehicle manufacturing method capable of imparting individual identification information with high reading accuracy and space saving even when the amount of information to be recorded increases.

Solution to Problem

The invention has the following configuration.

(1) A bearing component which is an annular member with a two-dimensional code which has a shape with a maximum circumferential dimension longer than a maximum radial dimension or a maximum axial dimension.

(2) A bearing which includes the bearing component according to (1).

(3) A machine which includes the bearing component according to (1).

(4) A vehicle which includes the bearing component according to (1).

(5) An individual identification method for a bearing component, including the steps of:

imaging a bearing component which is an annular member having a two-dimensional code having a shape with a maximum circumferential dimension longer than a maximum radial dimension or a maximum axial dimension and where at least one of a plurality of dot rows arranged in a longitudinal direction of the two-dimensional code is a line pattern where all dots are marked while rotating the bearing component in a circumferential direction;

detecting the line pattern of the two-dimensional code from an obtained captured image;

recognizing the two-dimensional code based on an extension direction of the detected line pattern;

extracting registration information corresponding to information of the two-dimensional code by referring to a database based on recognized information of the two-dimensional code; and identifying the bearing component according to the extracted registration information.

(6) A method for manufacturing a bearing, in which the bearing is manufactured by using the bearing component according to (1)

(7) A method for manufacturing a machine, in which a machine is manufactured using the bearing component according to (1).

(8) A method for manufacturing a vehicle, in which a vehicle is manufactured using the bearing component according to (1).

(9) A method for reading the two-dimensional code included in the bearing component according to (1), including the steps of:

first, imaging the bearing component;

second, detecting a circumferential position of the bearing component in which the two-dimensional code is arranged from a captured image of the bearing component;

third, capturing the circumferential position of the bearing component and acquiring a captured image of the two-dimensional code; and fourth, reading information of the two-dimensional code from the captured image of the two-dimensional code.

(10) A method for reading the two-dimensional code included in the bearing component according to (1), including:

imaging the bearing component, and reading information of the two-dimensional code from the captured image of the bearing component.

Advantageous Effects of Invention

According to the invention, even when the amount of information to be recorded increases, individual identification information can be provided with high reading accuracy and space saving.

BRIEF DESCRIPTION OF DRAWINGS

FIGS. 6A to 6C are explanatory views illustrating a procedure up to reading imaging data and performing a recognition process for reading information on the two-dimensional code.

FIGS. 10A and 10B are schematic cross-sectional views of a main part illustrating another configuration example of a workpiece rotation drive unit included in the reading device.

DESCRIPTION OF EMBODIMENT

Hereinafter, embodiments of the invention will be described in detail with reference to the drawings. Here, an inner ring and an outer ring of a rolling bearing will be described as an example of a bearing component, but the invention is not limited to this and other components such as a holder and a seal member may be used.

Figure 1:
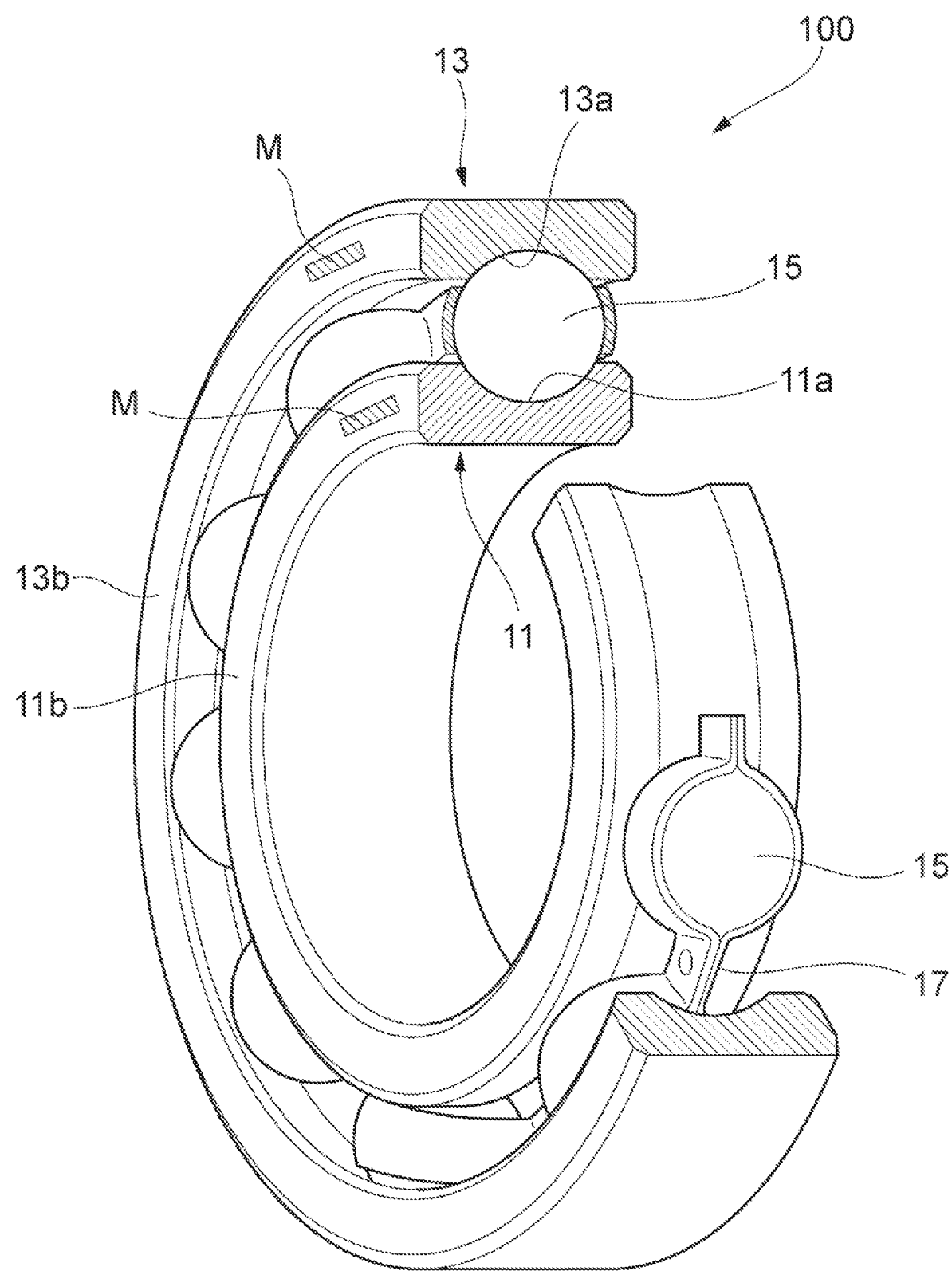
FIG. 1 is a partial cross-sectional perspective view of a rolling bearing.

FIG. 1 is a partial cross-sectional perspective view of a rolling bearing. The rolling bearing (hereinafter, simply referred to as "bearing") 100 includes an inner ring 11, an outer ring 13, a plurality of rolling elements 15 provided between the inner ring 11 and the outer ring 13, and a holder 17 for rotatably holding the rolling elements 15. The inner ring 11 is an annular body which is made of metal such as a steel material and has a raceway groove (guide surface) 11a of the rolling element 15 on an outer peripheral surface. The outer ring 13 is an annular body which is made of metal such as a steel material and has a raceway groove (guide surface) 13a of the rolling element 15 on an inner peripheral surface. A rectangular two-dimensional code M is provided on at least one of an axial end surface 11b of the inner ring 11 and an axial end surface 13b of the outer ring 13. FIG. 1 illustrates a configuration in which the two-dimensional code M is provided on both the inner ring 11 and the outer ring 13. The bearing 100 may be provided with a seal member (not illustrated).

The two-dimensional code M provided in the inner ring 11 includes individual identification information of the inner ring 11. The two-dimensional code M provided in the outer ring 13 includes the individual identification information of the outer ring 13. For each individual identification information, various information such as individual information and history information related to each individual, which will be described in detail below, can be extracted by referring to a database prepared in advance.

The two-dimensional code M is preferably stamped on the inner ring 11 and the outer ring 13 by laser marking. The axial end surfaces 11b and 13b of the inner ring 11 and the outer ring 13 are easily damaged by being in contact with surrounding members. Therefore, a recessed area may be formed on the axial end surfaces 11b and 13b and the two-dimensional code M may be engraved on the recessed area. As a method for marking a metal surface, there are various known techniques and all of which are applicable. However, especially, it is preferable to apply a laser marking method because laser marking can be formed quickly and accurately.

FIGS. 2A to 2D are explanatory views illustrating an example of a two-dimensional code.

Figure 2A:
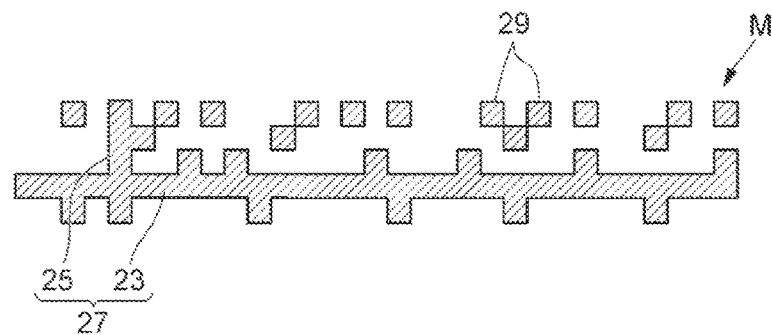
FIGS. 2A to 2D are explanatory views illustrating an example of a two-dimensional code.

The two-dimensional code M illustrated in FIG. 2A includes an alignment pattern 27 having a pair of line patterns 23 and 25 orthogonal to each other and a plurality of dots (cells) 29. The long line pattern 23 and the short line pattern 25 are arranged in a cross shape and the plurality of dots 29 are arranged in a grid pattern along the line patterns 23 and 25. At each position of the grid pattern, it is either a laser-marked marking point or a non-marked point and the dot 29 illustrated in FIG. 2A indicates the marked marking point. That is, the line pattern 23 is a pattern in which all the dots are marked in any of a plurality of dot rows arranged in a longitudinal direction of the two-dimensional code M. The line pattern 23 may be a single dot row or a plurality of dot rows. Similarly, the line pattern 25 is a pattern in which all dots are marked in any of a plurality of dot rows arranged in a direction orthogonal to the longitudinal direction of the two-dimensional code M.

Figure 2B:
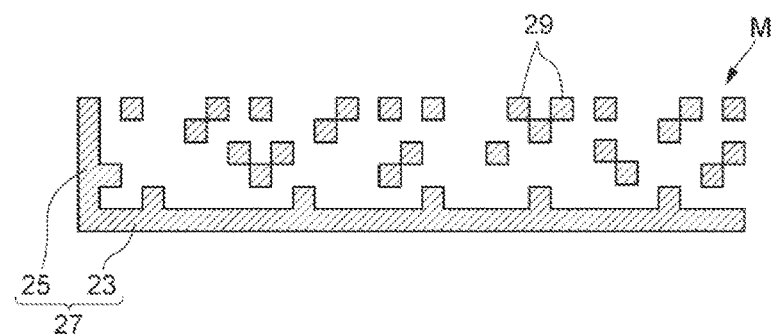

The two-dimensional code M illustrated in FIG. 2B includes the alignment pattern 27 having a pair of line patterns 23 and 25 which are L-shaped and orthogonal to each other and the plurality of dots (cells) 29. Here, the line pattern 23 is a pattern in which all the dots are marked in an outermost (lower end of FIG. 2B) row of the plurality of dot rows arranged in the longitudinal direction of the two-dimensional code M. The line pattern 25 is a pattern in which all dots are marked in an outermost (left end of FIG. 2B) row of the plurality of dot rows arranged in the direction orthogonal to the longitudinal direction of the two-dimensional code M.

Figure 2C:
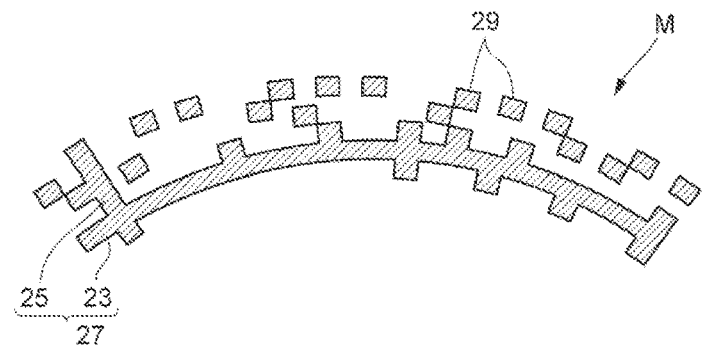
Figure 2D:
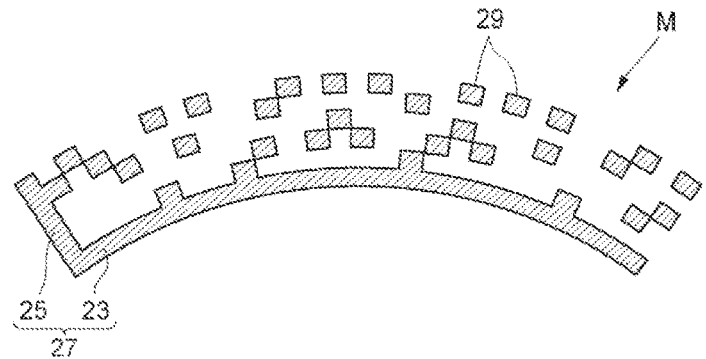

The two-dimensional code M illustrated in FIGS. 2C and 2D is a fan-shaped two-dimensional code M. In the two-dimensional code M, the line pattern 23 is arranged along a circumferential direction and the line pattern 25 is arranged along a radial direction. The fan-shaped two-dimensional code M has an arc shape on the inner peripheral side and the outer peripheral side, respectively, and a linear shape along the radial end on the peripheral end side. The plurality of dots 29 are arranged along the radial direction and the circumferential direction. The line patterns 23 and 25 of FIG. 2C have cross-shaped intersections with each other and the line patterns 23 and 25 of FIG. 2D are arranged so that the intersections of the line patterns 23 and 25 of FIG. 2D are L-shaped.

The two-dimensional code M may be trapezoidal, convex, or the like in addition to the above-described rectangular shape and fan shape and may have a shape in which the maximum dimension in the circumferential direction of the bearing is longer than the maximum dimension in the radial direction.

Figure 3:
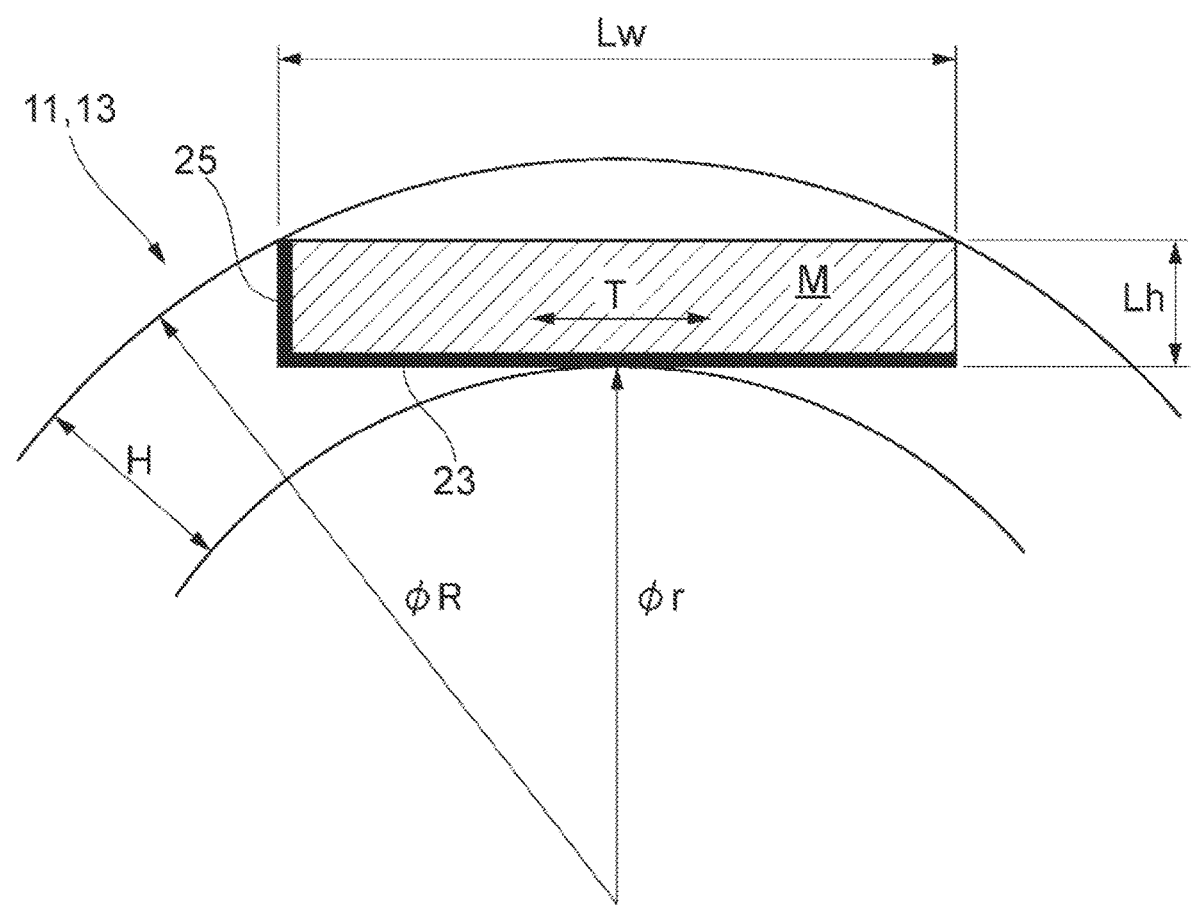
FIG. 3 is an explanatory view schematically illustrating an arrangement example of the two-dimensional code engraved on axial end surfaces of an inner ring and an outer ring.

FIG. 3 is an explanatory view schematically illustrating an arrangement example of the two-dimensional code M engraved on the axial end surface of the inner ring 11 and the outer ring 13.

The two-dimensional code M engraved on the inner ring 11 and the outer ring 13 has a shape in which a maximum circumferential dimension Lw is longer than a maximum radial dimension Lh. Here, ϕR indicates an outer diameter and ϕr indicates an inner diameter. An extension direction of the long line pattern 23 is orthogonal to the radial direction of the annular inner ring 11 and the annular outer ring 13 at a center of the line pattern 23 in the longitudinal direction. That is, the line pattern 23 is generally arranged to coincide with a tangential direction T of the annular inner ring 11 and the annular outer ring 13 at the marking position of the two-dimensional code M. The term "coincide" as used herein means that the angle falls within a range of ±20°, preferably ±10°.

As described above, by engraving the two-dimensional code M on the axial end surfaces 11b and 13b of the inner ring 11 and the outer ring 13, respectively, individual identification information can be given to each of the inner ring 11 and the outer ring 13. In general, the two-dimensional code is not visually readable like character string information, so one cell can be arranged in a small size (code size: 0.85×0.25 mm, 1.36×0.40 mm, or the like.) of about 40 μm to 25 μm. Accordingly, since the size of the two-dimensional code M is small, space-saving arrangement is possible even in a limited small space, and thus the degree of freedom in the arrangement of the two-dimensional code is increased.

On the other hand, in one-dimensional codes such as character string information and barcodes, the information itself becomes unreadable when a part of the code is missing due to scratches or the like. However, in the two-dimensional code, information can be read even when a part of the code is missing. Therefore, even when the inner ring 11 or the outer ring 13 is used in an environment where the rings are easily scratched, the individual identification information can be reliably added without affecting the readability by using the two-dimensional code M.

Next, a specific example of product management using the two-dimensional code M will be described.

Figure 4:
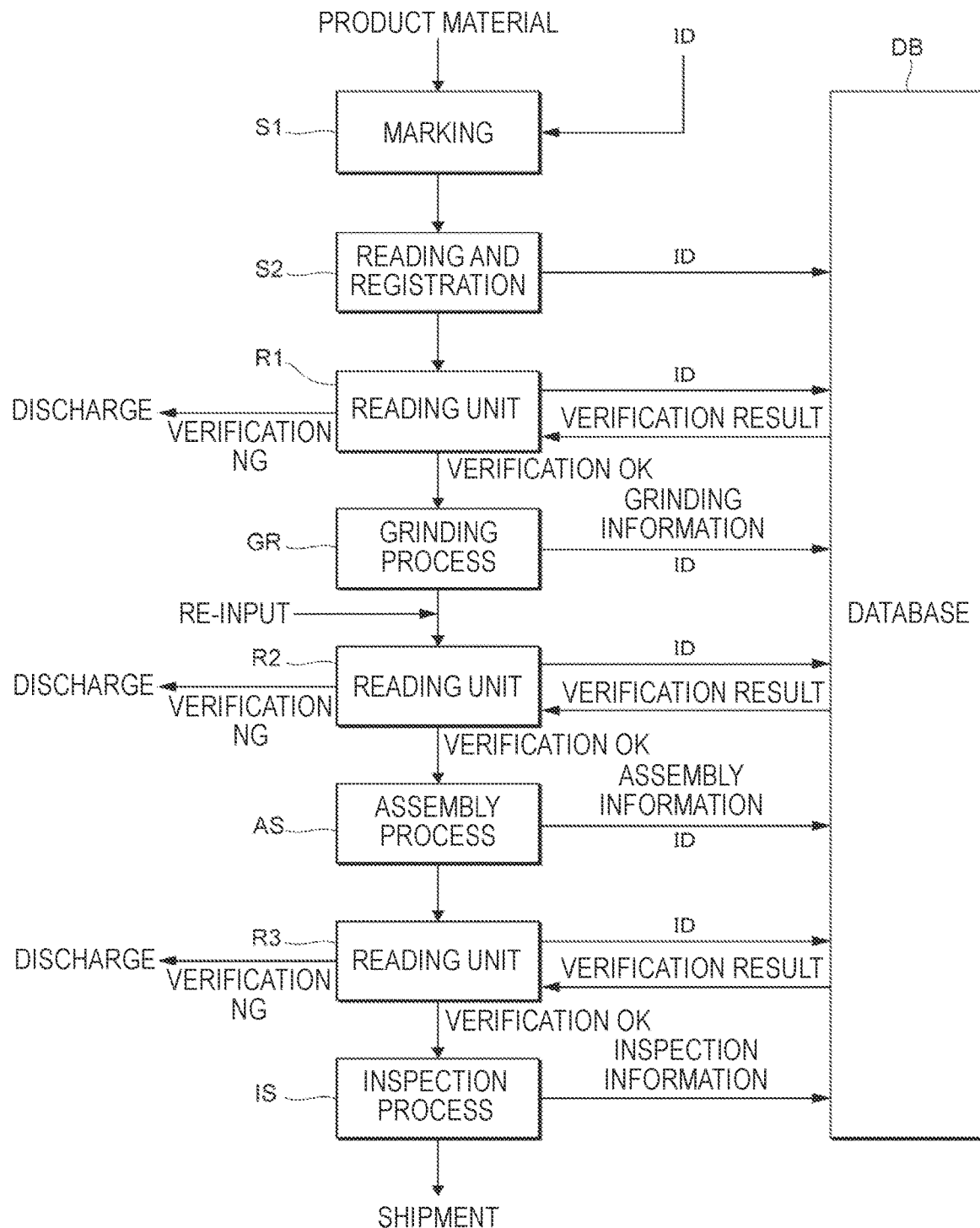
FIG. 4 is a process explanatory view schematically illustrating a part of processes in a rolling bearing production line.

FIG. 4 is a process explanatory diagram schematically illustrating a part of processes in a rolling bearing production line.

A pre-shipment production and control process of the bearing 100 includes a grinding process GR, an assembly process AS, and an inspection process IS.

In the grinding process GR, an annular product material (workpiece) to be the inner ring 11 or the outer ring 13 is subjected to a grinding process for forming the raceway groove 11a or 13a illustrated in FIG. 1, in such a manner that the inner ring 11 and the outer ring 13 are manufactured. The workpiece is supplied to the grinding process GR in a state where the axial end surface and the outer peripheral surface or inner peripheral surface are ground.

In the assembly process AS, the bearing 100 including the inner ring 11, the outer ring 13, the rolling element 15, and the holder 17 is assembled. In the inspection process IS, the assembled bearing 100 is inspected.

In a previous stage of the grinding process GR described above, a marking process S1 for engraving the two-dimensional code M representing the individual identification information (ID) unique to the workpiece and a reading and registration process S2 for reading the engraved marking and registering the read ID in the database are performed.

In the marking process S1, the two-dimensional code M representing an ID corresponding to the workpiece is stamped on a product material with respect to the workpiece transported to the production line. A marking position is not particularly limited, but is, for example, axial end surfaces 11b and 13b as illustrated in FIG. 1. The ID of the two-dimensional code M to be engraved is created according to a prescribed rule and may be set according to various conditions such as the date and time of processing, the material, the lot number, and the heat treatment, or may be a serial number.

In the reading and registration process S2, the workpiece on which the two-dimensional code M is stamped in the marking process S1 is set in a reading device 30 (see FIG. 5) described below and the stamped two-dimensional code M is read. Then, the ID read from the two-dimensional code M is registered in a database DB. Here, the management information of each workpiece which is a bearing component is registered in the database DB in association with the read ID.

The workpiece for which the reading and registration process S2 for the two-dimensional code M is completed is transported to a reading unit R1 for the two-dimensional code, which is a previous stage of the grinding process GR.

The reading unit R1 (the same applies to reading units R2 and R3 below) also includes a reading device 30 (see FIG. 5) described below. The reading unit R1 sets the transported workpiece in the reading device 30 and reads the two-dimensional code M engraved on the workpiece. Then, with reference to the information in the database DB corresponding to the read ID, it is determined (verified) whether the workpiece of that ID is a workpiece which may be subjected to the next process (machining, assembly, inspection).

As a result of verification, when the workpiece is a workpiece which can be subjected to the next process, the workpiece is transported to the grinding process GR. On the other hand, when the workpiece is a defective workpiece or when an abnormality occurs in equipment and the workpiece cannot be advanced to the next process, the workpiece is discharged from the production line as a "discharge workpiece".

In the grinding process GR, the raceway surfaces are formed on the transported workpieces, and thus the workpieces are processed into the inner ring 11 and the outer ring 13 shown in FIG. Then, processing information in the grinding process GR is registered in the database DB in association with the ID read by the reading unit R1. The processing information includes various kinds of information such as a grinding machine, a tool, and a machining condition used in the grinding process GR. The processed workpiece (inner ring 11 or outer ring 13) is transported to the reading unit R2, which is a previous stage of the assembly process AS.

The reading unit R2 reads the two-dimensional code M stamped on the workpiece and refers to the information in the database DB corresponding to the read ID, similarly to the reading unit R1 described above. When the workpiece with that ID is a workpiece which may be subjected to the next process, the workpiece is transported to the assembly process AS, and when the workpiece cannot be advanced to the next process, the workpiece is discharged from the production line as a "discharge workpiece". When the workpiece is discharged, the discharge information is recorded in the database DB in association with the ID of the workpiece.

Discharge information contributes to surely preventing the workpiece from flowing out to a subsequent process even when the workpiece once discharged is re-input to the production line due to human error or distinguishing a target workpiece from discharged workpieces when it is necessary to investigate the contents of NG.

In the assembly process AS, in addition to the workpiece (one of inner ring and outer ring) transported from reading unit R2, another workpiece (the other of inner ring and outer ring) corresponding to the workpiece, the rolling element 15, and the holder 17 illustrated in FIG. 1 are prepared. That is, in the assembly process AS, various bearing components including the inner ring 11, the outer ring 13, the rolling element 15, and the holder 17 which forms the rolling bearing are prepared and the bearing 100 is assembled using the various bearing components.

Here, the workpiece is engraved with the two-dimensional code M corresponding to the above-described ID and the ID is registered in the database DB. However, other bearing components (rolling element 15, holder 17, seal member (not illustrated), and the like) may also be provided with a code by engraving a two-dimensional code or the like and managed in the database DB together with the ID of the workpiece. The two-dimensional code M can be engraved on a shaft end surface of a roller when the rolling element is a roller.

Then, the bearing 100 assembled in the assembly process AS is associated with the ID read by the reading unit R2 and the assembly information in the assembly process AS is registered in the database DB. The assembly information includes various kinds of information such as information on the combination of the inner ring 11 and the outer ring 13, information on the lot number of the bearing 100, and information on other bearing components.

Next, the bearing 100 after the assembly process AS is transported to the reading unit R3, which is a pervious stage of the inspection process IS.

In the reading unit R3, the two-dimensional code M stamped on the workpiece is read in the same manner as the reading units R1 and R2 described above, and then the database DB is referred to by using the read ID. When the workpiece with the ID is a workpiece which may be subjected to the next process, the workpiece is transported to the inspection process IS, and when the workpiece cannot be advanced to the next process, the workpiece is discharged from the production line. When the workpiece is discharged, discharge information is recorded in the database DB in association with the ID of the workpiece.

In the inspection process IS, a predetermined inspection is performed on the workpiece. Then, the inspection result is associated with the ID read by the reading unit R3 and registered in the database DB. The inspection information includes information such as appearance, presence of abnormal noise, inspection results obtained by performing such as sealing property, and the like. Inspection information is also associated with the ID of the workpiece in the ID of each of the other bearing components assembled together with the workpiece.

Then, the bearing 100 is shipped as a product through pre-shipment processes such as packing and storage.

As described above, the ID is read from the two-dimensional code M stamped on the product material each time the workpiece of the product material passes through each of the processes of the grinding process GR, the assembly process AS, and the inspection process IS. Then, it is verified with the database DB whether the subsequent process can be carried out on the work. Process information such as processing information, assembly information, and inspection information is associated with the read ID and registered in the database DB.

As a result, it is possible to prevent unnecessary processing from being performed. Even when a problem occurs in the bearing after the product is shipped, corresponding management information can be easily extracted from the database DB based on the ID of the inner ring or the outer ring of the bearing. Therefore, history information such as which tool of which machine the defective bearing is machined and which part is combined with the bearing can be tracked, which can contribute to the improvement of production quality.

The two-dimensional code M is assigned to all of the product materials and the two-dimensional code M of the workpiece is read before and after each process of the grinding process GR, the assembly process AS, and the inspection process IS. For example, the workpiece (bearing 100, inner ring 11, outer ring 13) is extracted from the production line, and then when the workpiece is re-input to the production line with the reading unit R2 or the like, illustrated in FIG. 4, the re-input workpiece has different specifications such as lots and processing conditions from the workpieces before and after the line. Although, since the two-dimensional code M is assigned to all the workpieces, the history information of the individual can be traced regardless of the manufacturing order. In other words, the history of each process of bearing components for which independent IDs are assigned to all individuals is associated with that ID and registered in the database, so that quality control of all products can be performed reliably for each part.

Next, a reading device which reads the two-dimensional code described above will be described.

Figure 5:
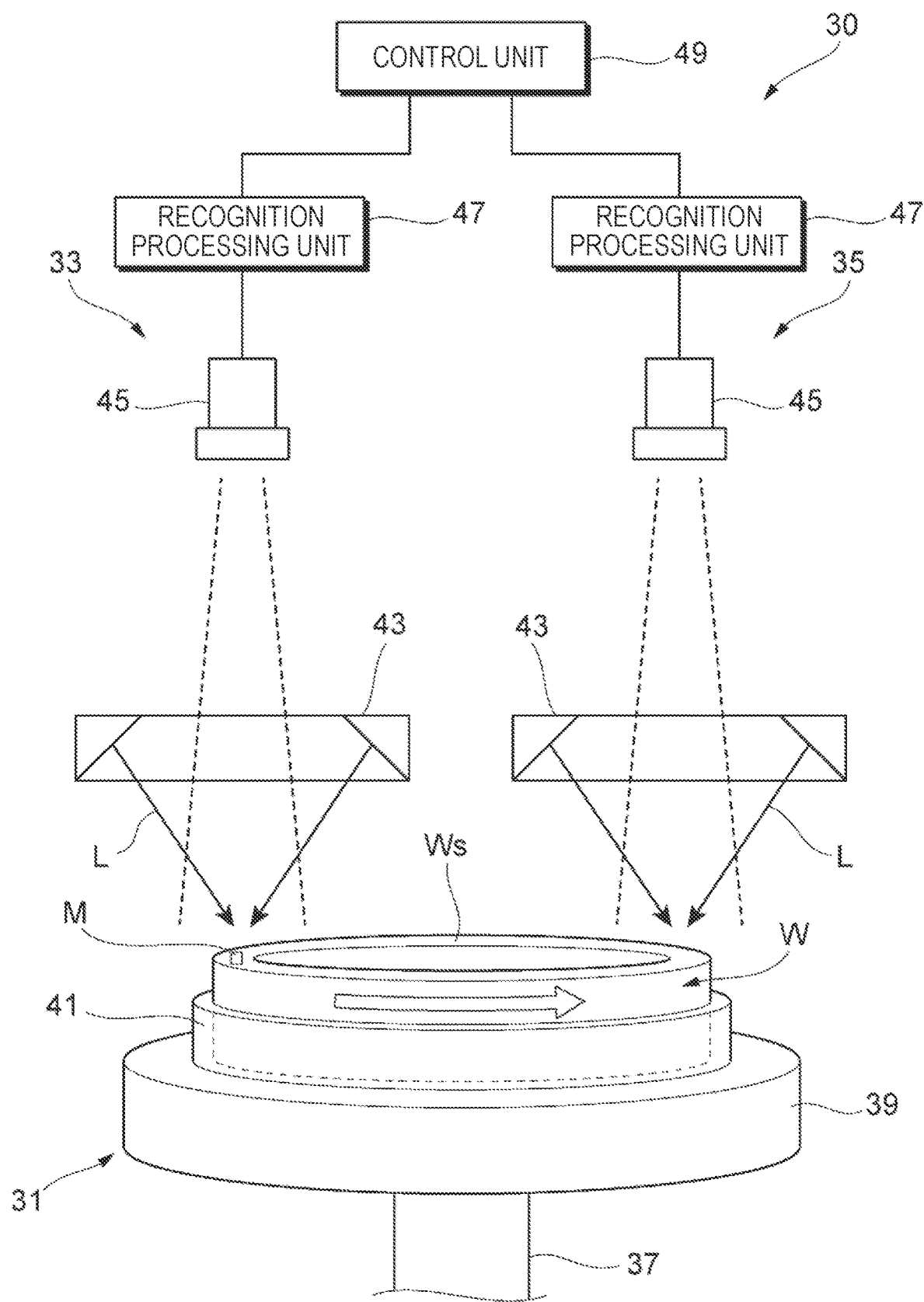
FIG. 5 is a schematic configuration diagram illustrating an example of a reading device used in a reading unit of FIG. 4.

FIG. 5 is a schematic configuration diagram illustrating an example of the reading device 30 used in the reading units R1 to R3 of FIG. 4.

The reading device 30 includes a workpiece rotation drive unit 31 which rotates while holding the workpiece W (it may be the inner ring 11, the outer ring 13, or the bearing 100), two imaging optical systems 33 and 35, and a control unit 49 which controls the imaging optical systems 33 and 35.

The workpiece rotation drive unit 31 includes a rotating shaft 37 extending in an up-down direction, a workpiece mounting table 39 having a disk-shape and fixed to an upper end portion of the rotating shaft 37, and a drive unit (not illustrated) which rotationally drives the rotating shaft 37. The workpiece mounting table 39 includes a positioning frame 41 which is provided to project upward from an upper surface of the mounting table and holds an outer peripheral surface of the workpiece W coaxially with the rotating shaft 37. The positioning frame 41 prevents the workpiece W from being displaced when the workpiece mounting table 39 is rotated. The positioning frame 41 may hold an inner peripheral surface of the workpiece W and may be omitted depending on the size of the workpiece W, rotation conditions, and the like.

Each of the pair of imaging optical systems 33 and 35 includes a light irradiation unit 43 which irradiates an axial end surface Ws (axial end surfaces 11b and 13b in FIG. 1) of a workpiece W with an illumination light ray L, an imaging unit 45 which receives a reflected light ray from the axial end surface Ws and images a predetermined region, and a recognition processing unit 47 which performs arithmetic processing on the captured image.

The imaging optical system 33 images one circumferential position in the axial end surface Ws of the workpiece W and the imaging optical system 35 images the axial end surface Ws in the other circumferential position which is separated from one circumferential position by 180° at a central angle. That is, the imaging optical systems 33 and 35 simultaneously image both ends in a radial direction of the axial end surface Ws of the workpiece W, that is, point-symmetrical positions separated by 180° in the circumferential direction.

A control unit 49 controls the drive of the workpiece rotation drive unit 31 and the like according to the output of respective recognition processing units 47 of the imaging optical systems 33 and 35.

In the reading device 30 configured as described above, the workpiece rotation drive unit 31 rotates the workpiece W at a predetermined rotation speed. Then, each of the two imaging optical systems 33 and 35 continuously images the axial end surface Ws of the rotating workpiece W at a predetermined frame rate (for example, 10 to 60 frame/sec).

Here, since imaging is performed using two imaging optical systems 33 and 35 at the same time, at least a part of the two-dimensional code M is reflected in the captured image only by rotating the workpiece W by at least 180°. Therefore, the engraved position of the two-dimensional code M can be detected faster than the case of searching with only one imaging optical system. The size (field of view size) of the imaging region is adjusted to a size corresponding to the rotation speed of the workpiece W and the imaging ability of the imaging optical systems 33 and 35.

The imaging optical systems 33 and 35 output continuously captured images to the respective recognition processing units 47. In the recognition processing unit 47, the captured image in which the entire two-dimensional code M is contained in the imaging region is selected from the input imaging data, and then the two-dimensional code M is read from the selected captured image. The reading device 30 illustrated in FIG. 5 includes two imaging optical systems 33 and 35, but the number of imaging optical systems may be three or more.

FIGS. 6A to 6C are explanatory views illustrating a procedure from reading the imaging data to performing the code recognition process for reading the two-dimensional code information.

The recognition processing unit 47 continuously images the rotating workpiece W. For example, one round of the workpiece W is imaged with, for example, ten captured images so that a part of the imaging region overlaps. The captured images in the case of the present setting are roughly classified into a captured image of an imaging region IMG1 illustrated in FIG. 6A in which the two-dimensional code M is not reflected in the captured image, a captured image of an imaging region IMG2 illustrated in FIG. 6B in which a part of the two-dimensional code M is projected on the imaging region, and a captured image of an imaging region IMG3 in which the entire two-dimensional code M illustrated in FIG. 6C is projected in the imaging region.

From the images, the captured image of the imaging region IMG3 is selectively extracted and a recognition process for the two-dimensional code M is performed using the captured image of the imaging region IMG3. The extraction process of the captured image can be performed, for example, by performing appropriate image processing on the captured images of a large number of captured data and extracting the image and selecting a specific captured image according to a relationship between a frame rate of the captured data, the rotation speed of the workpiece W, and the like. When the captured image illustrated in the imaging region IMG3 is obtained during imaging, the subsequent imaging may be stopped. Here, the reading time of the imaging data can be shortened and the tact can be improved. By predicting an imaging time of the specific captured image described above and imaging it at the predicted time, a captured image in which the entire two-dimensional code M is projected may be obtained.

It is preferable that, as illustrated in the image of the imaging region IMG3 illustrated in FIG. 6C, the two-dimensional code M be arranged in a center of the imaging region IMG3 and the longitudinal direction of the two-dimensional code M coincide with an arrangement direction of imaging pixels in order to easily carry out the recognition process. Therefore, the two-dimensional code M is placed on the workpiece W in a state of making an extension direction of the line pattern 23 of the two-dimensional code M orthogonal to a radial direction r of the annular workpiece W, that is, setting a direction which coincides with a tangential direction T at the engraved position of the two-dimensional code M.

Figure 7:
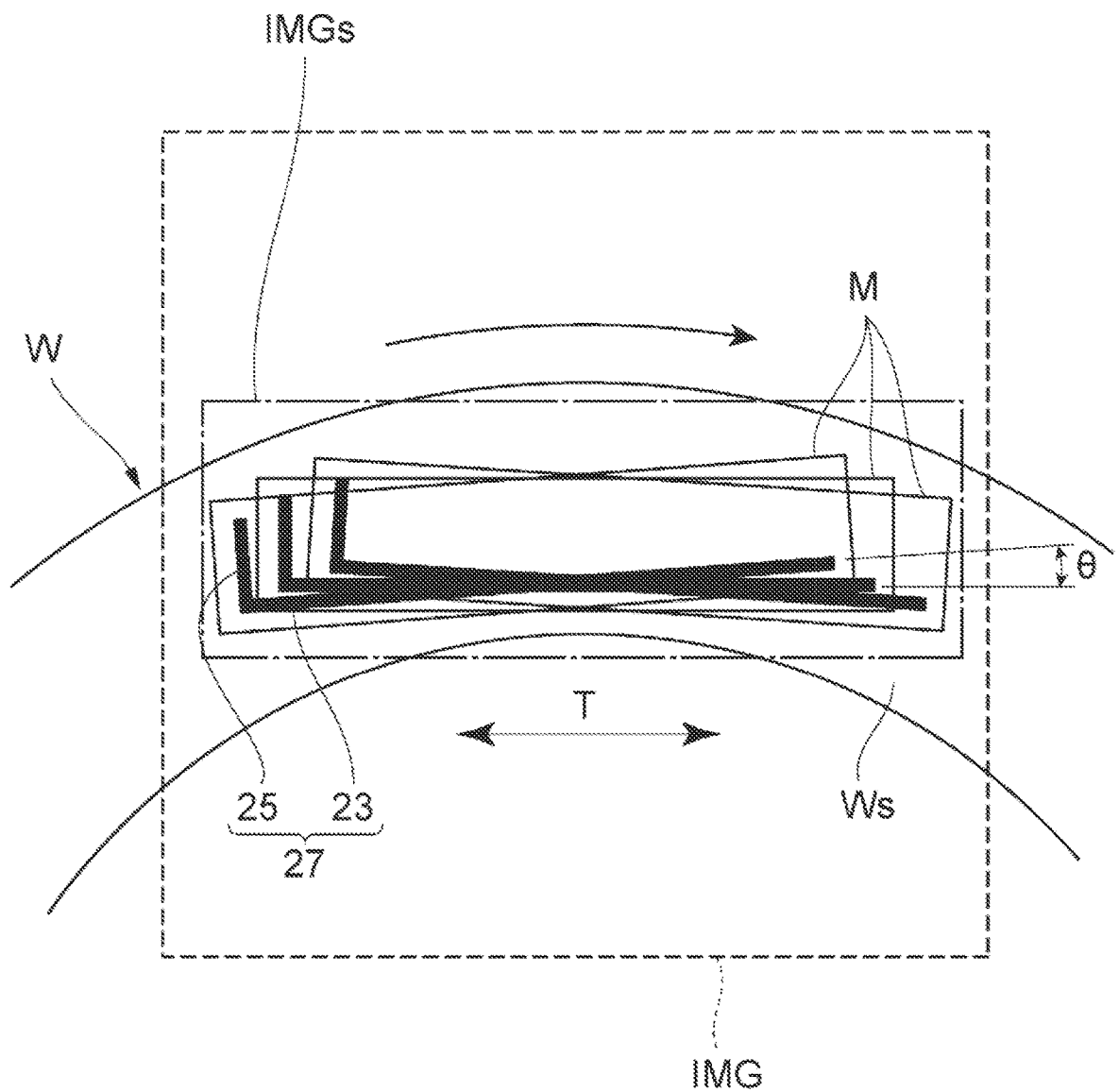
FIG. 7 is a schematic explanatory view illustrating how the two-dimensional code is inclined.

FIG. 7 is a schematic explanatory view illustrating how the two-dimensional code is inclined.

An angle θ formed by the extension direction of the line pattern 23 of the two-dimensional code M and a horizontal direction (horizontal pixel arrangement direction of image elements) of the captured image is preferably in a range of ±100 to ±20°. That is, the closer θ is to a multiple (135°, 225°, 315°) of 45°, the longer the reading processing time (calculation time) of the two-dimensional code, or the more difficult it becomes to read accurately. Therefore, it is preferable that the radial line passing through the center of the circle of the annular workpiece W be orthogonal to the horizontal direction of the captured image and the image be taken with reference to a circumferential angle of 0° and 180° in a plan view of the workpiece W. It is preferable to minimize the circumferential width of the imaging region (the length in the longitudinal direction of the two-dimensional code) because unnecessary calculations can be omitted.

When the extension direction of the line pattern 23 does not match the tangential direction T of the annular workpiece W, that is, when the extension direction is inclined from the tangential direction T, as the workpiece W rotates, the line pattern 23 tends to protrude from the imaging region. Here, it is necessary to lower imaging magnification in order to project the entire two-dimensional code M, and thus the detection accuracy is lowered.

Therefore, by keeping the direction (angle θ) of the two-dimensional code M within the range described above, even when the imaging region IMG is narrowed (see, for example, an imaging region IMGs indicated by the alternate long and short dash line), the entire code can be easily included in the imaging region IMG. Since the correction for the code inclination at the time of reading the information of the two-dimensional code M can be reduced, the calculation processing time can be shortened and the reading speed can be improved. Since each cell of the two-dimensional code M can be read efficiently and accurately, the reading accuracy of the code content is improved. The effects of shortening the processing time and improving the reading accuracy described above become more remarkable as the number of images taken increases and the imaging region becomes wider.

The length of the imaging region IMG illustrated in FIG. 7 in a vertical direction greatly affects the image processing time. Therefore, by narrowing an allowable range of variation in the position of the two-dimensional code in the vertical direction, it is not necessary to process extra figures other than the code, and thus it is possible to read the two-dimensional code at high speed and reliably.

When the long line pattern 23 is present in the captured image along the tangential direction T of the annular workpiece W, it becomes easy to detect a circumferential position of the two-dimensional code M even when the workpiece W is rotated at high speed. Therefore, as described above, the two-dimensional code M preferably has a shape in which a maximum dimension in the circumferential direction is longer than a maximum dimension in the radial direction of the bearing, such as a horizontally long rectangle or a fan shape along the circumferential direction. As a result, the detection accuracy can be improved as compared with the case where the two-dimensional coat is square. The smaller the two-dimensional code M is, the more likely it is that the two-dimensional code is overlooked in the rotary reading. In such a case, a two-dimensional code reading method according to the configuration becomes particularly useful.

Since details of a recognition process for reading the information of the two-dimensional code M are known techniques, the description thereof will be omitted here.

The above-described method of detecting the position (phase) of the two-dimensional code M and the method of acquiring a captured image for reading the code are examples, and are not limited thereto. For example, the method may be a two-step reading method in which the arrangement position of the two-dimensional code of the workpiece W is first detected from the captured image, and then the detected arrangement position is magnified and imaged to read the two-dimensional code.

That is, the method of reading the two-dimensional code by the reading device of the configuration has following steps (1) to (4).

(1) The first step of imaging the workpiece W.

(2) The second step of detecting the circumferential position of the workpiece W in which the two-dimensional code M is arranged from the captured image of the workpiece W.

(3) The third step of capturing the circumferential position of the workpiece W and acquiring the captured image of the two-dimensional code M.

(4) The fourth step of reading the information of the two-dimensional code M from the captured image of the two-dimensional code M.

The image captured in the first step described above is an image obtained by capturing the entire workpiece W and the image captured in the third step is an image obtained by enlarging or capturing a part of the workpiece W with high resolution.

Table 1 shows a method of detecting the position (phase) of the two-dimensional code M and Table 2 shows a method of acquiring an image for reading the two-dimensional code M.

TABLE 1

Two-dimensional code position (phase) detection

| No. | Number of imaging systems | Imaging range | Workpiece | Imaging system | Remarks |
|---|---|---|---|---|---|
| A1 | Single | Entire workpiece | Stationary | Stationary | Image entire workpiece |
| A2 | Single | Partially enlarged | Rotation | Stationary | Rotate workpiece and image it at a fixed position |
| A3 | Multiple | Partially enlarged | Rotation | Stationary | Rotate workpiece and image it from multiple locations |
| A4 | Single | Partially enlarged | Stationary | Move | image stationary workpiece by moving imaging system |
| A5 | Multiple | Partially enlarged | Stationary | Move | image stationary workpiece from multiple locations by moving each imaging system |
| A6 | Multiple | Partially enlarged | Stationary | Stationary | Switch imaging system |

TABLE 2

Acquirement of image for reading two-dimensional code

| No. | Workpiece | Imaging system | Circumferential position detection | Remarks |
|---|---|---|---|---|
| B1 | Rotation | Stationary | Yes | Rotate workpiece so that code is placed at imaging position |
| B2 | Stationary | Move | Yes | Move imaging system to code position |
| B3 | Stationary | Stationary | No | High-resolution imaging of entire workpiece |
| B4 | Rotation | Stationary | No | Workpiece rotation, finish when code is read |

As illustrated in Table 1, it may be a method (A1) in which the position of the two-dimensional code M is detected by imaging the entire other part of the workpiece W with one imaging optical system. Here, the structure of the reading device can be simplified.

As described above, in addition to the method (A2, A3) of imaging the workpiece W rotationally driven by a single or a plurality of imaging optical systems, it may be a method (A4, A5) of imaging the workpiece W while moving a single or a plurality of imaging optical systems. It may be a method (A6) in which a plurality of imaging systems for imaging different regions are prepared in advance and an output signal from the imaging optical system where the two-dimensional code of the workpiece W is included in the imaging region is selectively switched and used.

Figure 8A:
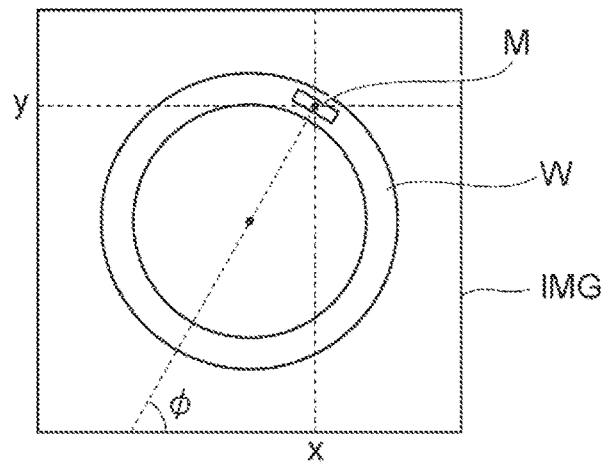
FIGS. 8A to 8C are explanatory views illustrating methods for detecting a position (phase) of the two-dimensional code.
Figure 8B:
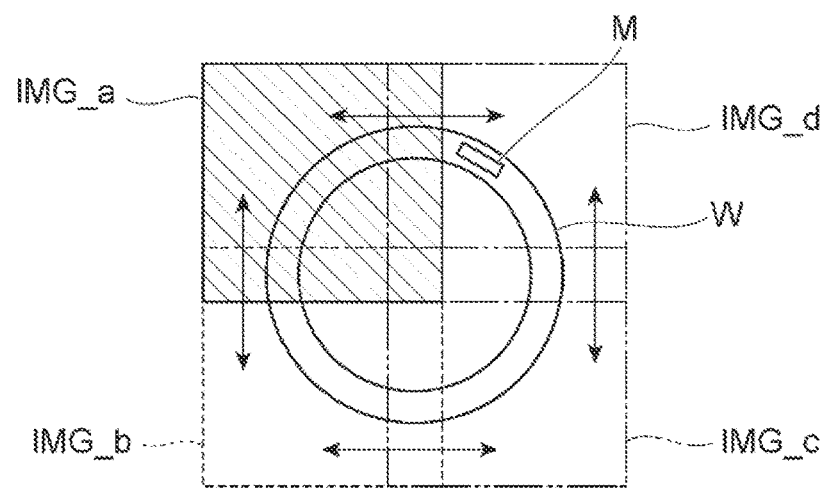
Figure 8C:
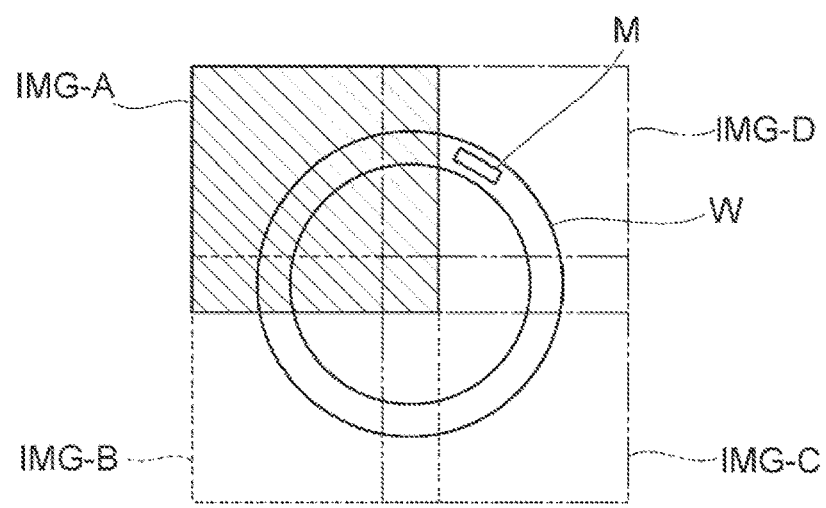

FIGS. 8A to 8C are explanatory views illustrating a method for detecting the position (phase) of the two-dimensional code.

As illustrated in FIG. 8A, the entire workpiece W may be imaged by a single imaging optical system and the position of the two-dimensional code M may be detected from the obtained captured image (A1). The arrangement position of the two-dimensional code M is represented as the position in the circumferential direction in the workpiece W by using, for example, the coordinates x and y and an inclined angle ϕ between an image horizontal direction (X direction) and an orthogonal direction of the line pattern 23 (see FIG. 7).

As illustrated in FIG. 8B, with the workpiece W stationary, a single imaging optical system may be moved to acquire captured images of imaging regions IMG_a to iMG_d at each destination position, and then the position of the two-dimensional code M may be detected from the captured image of the imaging region IMG_d including the two-dimensional code M (A4). In FIG. 8B, the imaging region IMG_a is shown by hatching. It is preferred that the imaging regions overlap each other. Here, when images are taken simultaneously using a plurality of imaging optical systems, the number of times of imaging can be reduced and the image acquisition time can be shortened (A5).

As illustrated in FIG. 8C, with the workpiece W stationary, a plurality of imaging optical systems may be fixed in advance to image a plurality of different locations in the circumferential direction of the workpiece W and captured images of different imaging regions IMG_A to IMG_D may be acquired by the plurality of imaging optical systems (A6). Here, the image acquisition time can be shortened by simultaneously imaging with the plurality of imaging optical systems. In FIG. 8C, the imaging region IMG_A is shown by hatching.

Examples of the process of re-imaging the detected position of the two-dimensional code and acquiring the image data for reading the two-dimensional code include the methods (B1) to (B3) shown in Table 2.

Figure 9A:
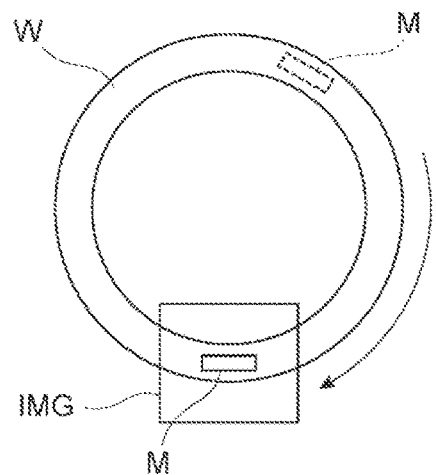
FIGS. 9A to 9C are explanatory views illustrating a method for acquiring an image for reading the two-dimensional code.
Figure 9B:
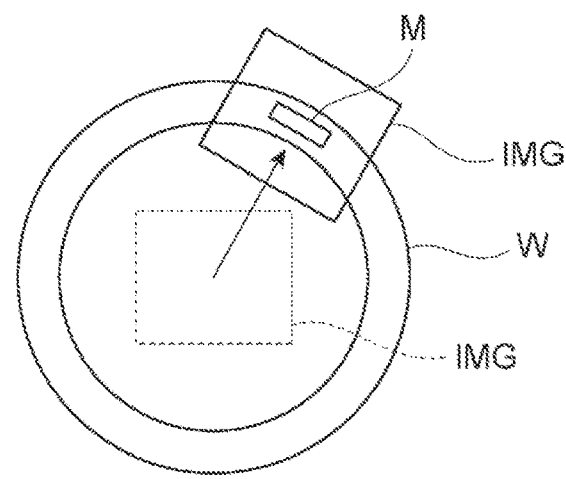
Figure 9C:
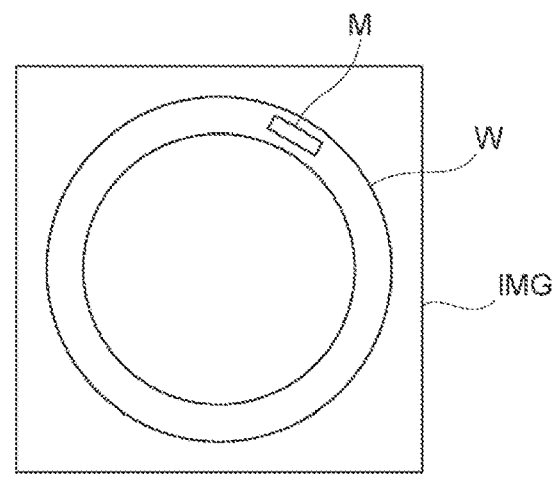

FIG. 9A to 9C are explanatory views illustrating a method for acquiring an image for reading the two-dimensional code.

As illustrated in FIG. 9A, the workpiece W may be rotated so that the detected two-dimensional code M fits in the imaging region IMG of one imaging optical system fixed at a predetermined fixed position and the two-dimensional code M located within the imaging region IMG may be imaged (B1).

As illustrated in FIG. 9B, by using one imaging optical system which can move within a placement plane of the stationary workpiece W, the imaging optical system may be moved and perform imaging so that the two-dimensional code M of the workpiece W fits within the imaging region IMG of the imaging optical system (B2). Here, the imaging optical system can move toward the two-dimensional code M in a shortest distance, and thus the imaging time can be shortened. Since the imaging optical system can be moved freely, the orientation of the imaging can be easily adjusted, and thus the horizontal direction of the captured image can be easily matched with the longitudinal direction of the line pattern of the two-dimensional code M.

As illustrated in of FIG. 9C, the entire workpiece W may be imaged to read the two-dimensional code M (B3). Here, it is desirable to take an image with a high resolution which does not affect the reading accuracy of the code information according to the size of the two-dimensional code M.

The above-described methods (A1 to A6) for detecting the position (phase) of the two-dimensional code and the methods (B1 to B3) for acquiring the image for reading the two-dimensional code can be appropriately combined and the optimum combination can be selected according to various conditions such as the size of the workpiece W and the space of the reading device.

When the imaging optical system is configured to have an increased imaging resolution, the two-dimensional code information can be directly read from the high-resolution captured image obtained by capturing the entire workpiece W. Here, it is not necessary to move the workpiece W or the imaging optical system, and thus the structure of the reading device can be greatly simplified.

The method for reading the two-dimensional code omits the step (2) of detecting the circumferential position of the two-dimensional code in (1) to (4) described above, and thus it is also possible to more easily read the two-dimensional code.

That is, a simpler reading method (B4) of the two-dimensional code includes, (1) A step of imaging bearing components, and
(2) A process of reading information of the two-dimensional code from the captured image of the bearing components.

According to the method for reading the two-dimensional code, the bearing component can be easily identified by reading the two-dimensional code of the bearing component.

Here, as described above, the bearing component is rotated or the imaging optical system is moved to extract the captured image in which the two-dimensional code is captured from the obtained captured image group and the two-dimensional code can be read from the extracted captured image. When the two-dimensional code is included in the captured image obtained by sequentially capturing a plurality of locations of the bearing component in real time and the information of the two-dimensional code is read from the captured image, the imaging of the captured image after the imaging location is stopped. Therefore, useless imaging can be omitted, and thus the tact time for two-dimensional code detection can be shortened.

A plurality of imaging optical systems may be fixed in advance to image a plurality of different locations in the circumferential direction of the workpiece W, and then captured images of different imaging regions may be acquired by the plurality of imaging optical systems. Here, the image acquisition time can be shortened by simultaneously imaging with the plurality of imaging optical systems. When the information of the two-dimensional code is read from the image captured by at least one imaging optical system among the plurality of imaging optical systems, the reading process of the captured image by the imaging optical system other than the imaging optical system is stopped. Therefore, unnecessary reading process can be omitted, and thus the calculation load for reading can be reduced. Therefore, the tact time of two-dimensional code detection can be shortened.

The above-described two-dimensional code reading method B4 is an example and it is also possible to appropriately combine the above-described steps A1 to A6 and B1 to B3.

Next, another configuration example of the reading device 30 will be described.

FIGS. 10A and 10B are schematic cross-sectional views of a main part illustrating another configuration example of the workpiece rotation drive unit included in the reading device 30.

The workpiece rotation drive unit 50 having the configuration includes a workpiece mounting table 51 on which the workpiece W is placed and a rotation support body 53 which supports and rotates the workpiece W.

The workpiece W shown here is the rolling bearing 100 including the inner ring 11, the outer ring 13, and the rolling element 15.

A circular through hole 51a is formed in the workpiece mounting table 51. The rotation support body 53 is arranged coaxially with the through hole 51a and is connected to a rotation drive mechanism (not illustrated) to be able to rotate and ascend and descend. The rotation support body 53 includes a shaft portion 53a, a flange portion 53b protruding radially outward on a base end side (lower side) of the shaft portion 53a, and an inclined guide portion 53c formed at the tip of the shaft portion.

In a state where the rotation support body 53 is retracted downward as illustrated in FIG. 10A, an end surface of the outer ring 13 is placed on a peripheral edge of the through hole 51a of the workpiece mounting table 51 and the rolling bearing 100 is supported by the workpiece mounting table 51.

Then, as illustrated in FIG. 10B, the rotation support body 53 is raised while being rotationally driven. Then, the shaft portion 53a of the rotation support body 53 is inserted into an inner peripheral surface of the inner ring 11 of the bearing 100 placed on the workpiece mounting table 51 while being guided by the inclined guide portion 53c. When the shaft portion 53a of the rotation support body 53 is inserted into the inner ring 11, an upper surface of the flange portion 53b abuts on the end surface of the inner ring 11, and the flange portion 53b lifts the inner ring 11, the outer ring 13 emerges from the workpiece mounting table 51. Here, the rolling bearing 100 is supported while being rotationally driven by the rotation support body 53.

According to the workpiece rotation drive unit 50 having the above configuration, the shaft portion 53a of the rotation support body 53 can be positioned with high accuracy on an axis of the inner ring 11, and thus the rolling bearing 100 can be rotationally driven without being eccentric.

In order to prevent slippage and misalignment of a workpiece such as the rolling bearing 100, it is preferable that the workpiece rotation drive unit 50 uses a resin material, a metal material, or a combination thereof that is compatible with the workpiece, has swelling property, or the like. It is more preferable that the surface of the workpiece rotation drive unit 50 be subjected to surface treatment such as roughening. Especially at the time of imaging, it is preferable to finish in a matte black color to prevent reflections other than the workpiece. By roughening the surface or providing at least fine grooves extending in the radial direction, the coefficient of friction with the workpiece can be increased, and thus a film of liquid such as oil adhering to the workpiece can be escaped.

The case where the two-dimensional code M to be read by the reading device 30 described above is provided in only one place of the workpiece W, that is, the axial end surface 11b of the inner ring 11 or the axial end surface 13b of the outer ring 13 is described.

However, the number of two-dimensional codes M is not limited to one. When the marking time on the production line is acceptable, the two-dimensional code M may be provided at a plurality of locations in the circumferential direction of the workpiece W. When the two-dimensional code M is provided at a plurality of locations, it is preferable to arrange the codes at equal intervals in the circumferential direction of the workpiece W. When the two-dimensional code M is provided at two locations at equal intervals in the circumferential direction of the workpiece W, it is equivalent to a state in which only one of the imaging optical systems 33 and 35 illustrated in FIG. 5 is activated. Therefore, here, the reading device 30 can be configured with only one imaging optical system, and thus the equipment cost can be reduced. When the two-dimensional code M is provided at a plurality of locations of the workpiece W and a plurality of imaging optical systems are used, the detection process of the two-dimensional code M can be made faster. As a result, the tact time can be shortened.

Figure 11:
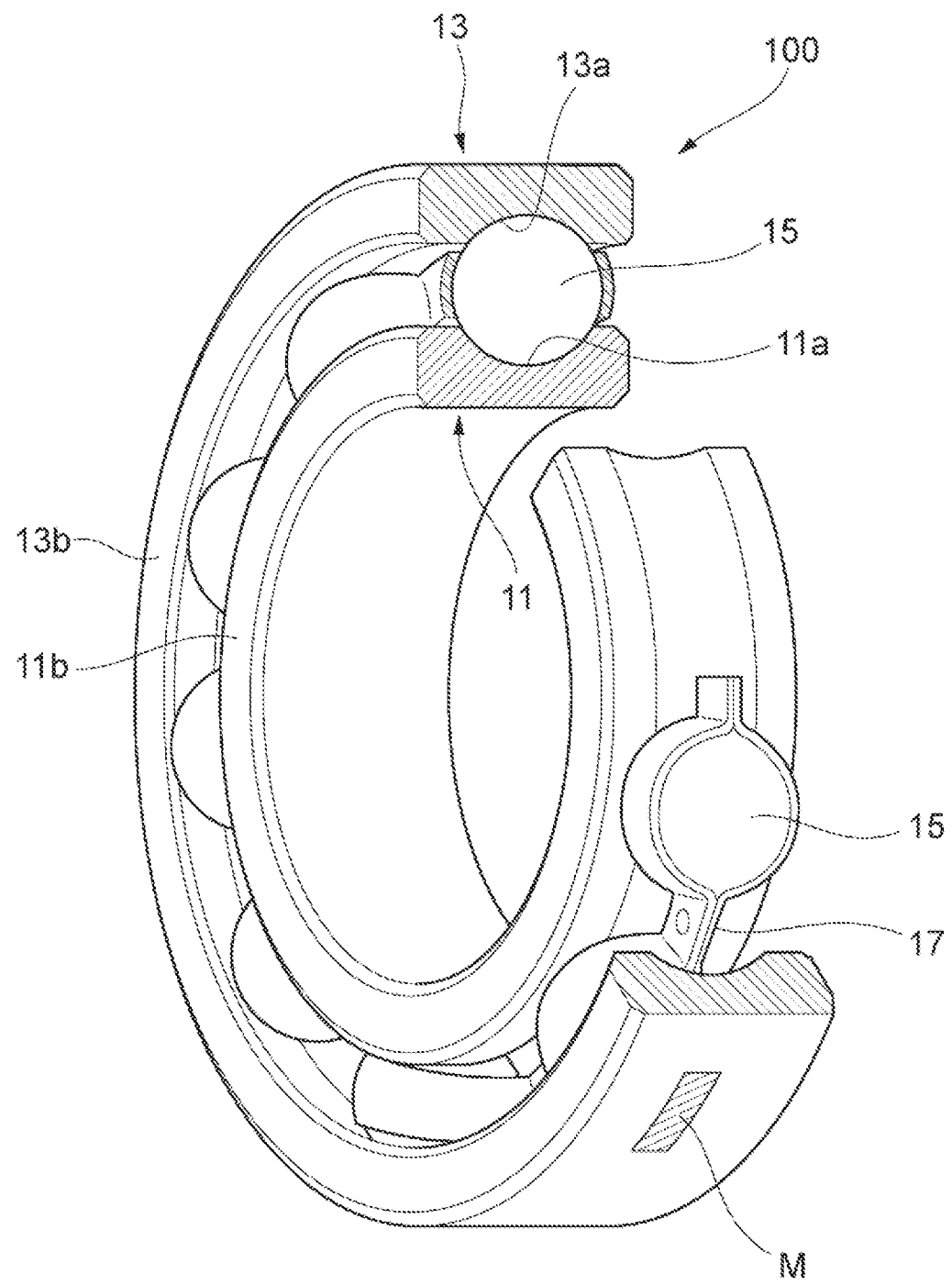
FIG. 11 is a partial cross-sectional perspective view of a bearing in which the two-dimensional code is provided on an outer peripheral surface of the outer ring.

As illustrated in FIG. 11, the two-dimensional code M may be provided on an outer peripheral surface 13c of the outer ring 13. When the two-dimensional code M is provided on the axial end surface 11b of the inner ring 11 or the axial end surface 13b of the outer ring 13, the axial end surfaces 11b and 13b may be rubbed depending on the manufacturing process. However, by providing the two-dimensional code M on the outer peripheral surface 13c of the outer ring 13, damage to the two-dimensional code in the manufacturing process can be prevented. The two-dimensional code M may be provided on an inner peripheral surface 11c of the inner ring 11. Accordingly, when the two-dimensional code M is provided on the outer peripheral surface 13c and the inner peripheral surface 11c, the arrangement space of the two-dimensional code M is wider than the case of the axial end surfaces 11b and 13b. Therefore, it is possible to increase the size of the two-dimensional code M. Here, the arrangement position of the two-dimensional code M becomes easy to see. Therefore, for example, when there is work to read the two-dimensional code at the time of product shipment, the work can be reduced. Even when the two-dimensional code M is provided on the outer peripheral surface 13c and the inner peripheral surface 11c, the probability of missing the two-dimensional code during the above-described rotational reading can be reduced.

A small and shallow two-dimensional code formed on the shaft end surface of the bearing may be used in the production of the bearing and a two-dimensional code may be given to the outer peripheral surface of the bearing at the time of shipment of the bearing. Here, the outer peripheral surface of the bearing has little effect on quality, so large and deep marking is possible. It is also possible to read the two-dimensional code M after bearing has been used on the market. The shape of the two-dimensional code provided on the outer peripheral surface of the bearing is preferably a shape in which the maximum dimension in the circumferential direction is longer than the maximum dimension in the axial direction of the bearing.

Figure 12:
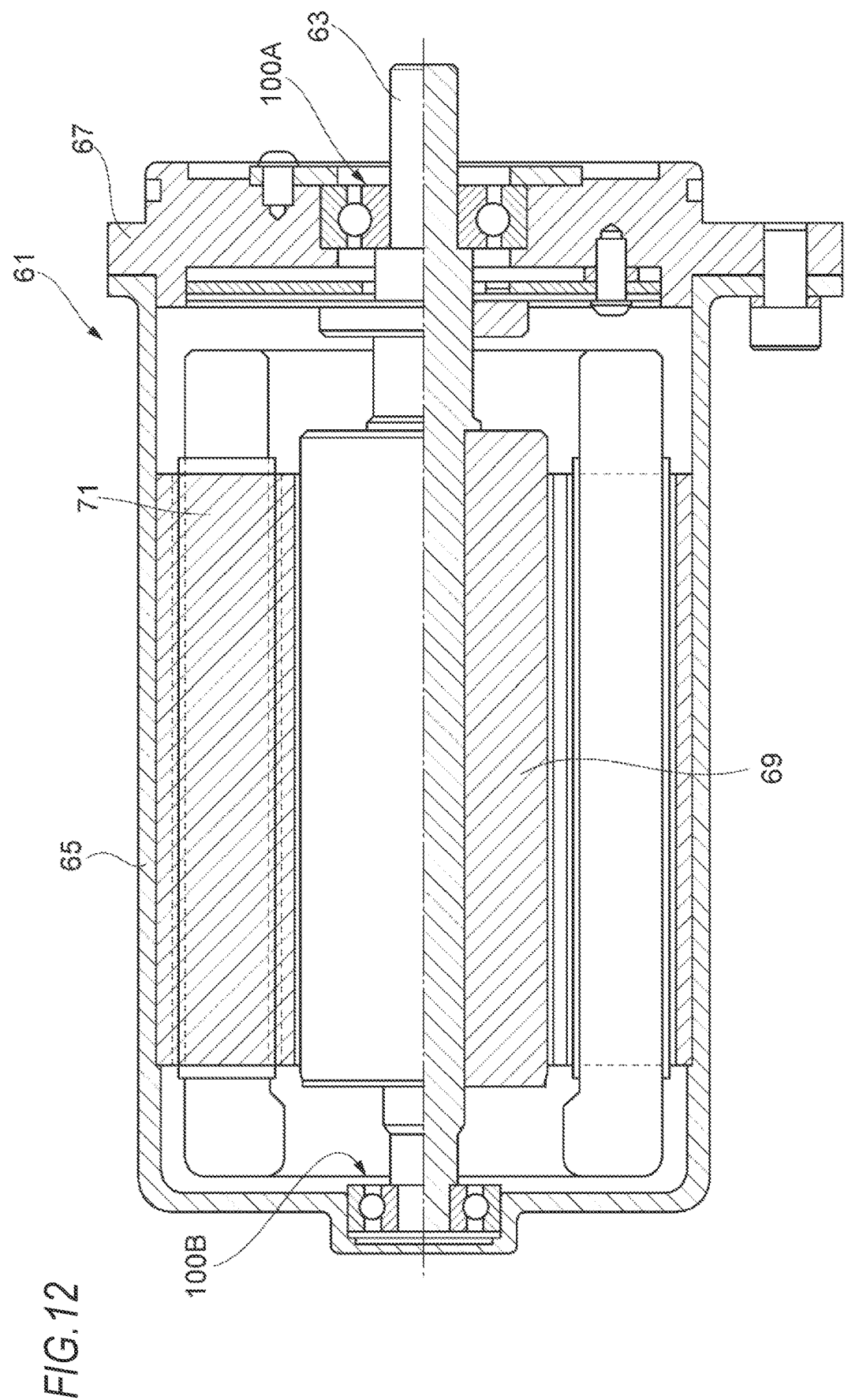
FIG. 12 is a schematic configuration diagram of a motor to which the bearing is applied.

The bearing described above can be applied to, for example, bearings 100A and 100B which support the rotating shaft 63 of a motor 61 illustrated in FIG. 12.

The motor 61 is a brushless motor and includes a center housing 65 having a cylindrical shape and a front housing 67 which has a substantially disk shape and closes one opening end of the center housing 65. Inside the center housing 65, a rotatable rotating shaft 63 is supported along an axis thereof via the bearings 100A and 100B arranged at the bottom of the front housing 67 and the center housing 65. A rotor 69 for driving a motor is provided around the rotating shaft 63 and a stator 71 is fixed to an inner peripheral surface of the center housing 65.

The motor 61 having the above configuration is generally mounted on a machine or a vehicle and rotationally drives the rotating shaft 63 supported by the bearings 100A and 100B.

As an application example of the bearing, a machine with a rotating part, various manufacturing equipment, for example, a screw device such as a ball screw device, and a rotary support portion of a linear motion device such as an actuator (combination of linear motion guide bearing and ball screw, XY table, and the like), and a steering column, a universal joint, an intermediate gear, a rack and pinion, an electric power steering device, and further a rotation support portion of a steering device such as a worm reducer, and still further a rotation support portion of a vehicle such as an automobile, a motorcycle, and a railroad can be exemplified. Bearings of the configuration can be suitably applied to locations which rotate relative to each other, which can lead to improvement in product quality.

The invention is not limited to the embodiment described above. It is also the intention of the invention to combine the configurations of the embodiment with each other, to modify and apply them based on the description of the specification and well-known techniques by those skilled in the art and those are included in the scope of seeking protection.

For example, in the embodiment described above, a rolling bearing is described as an example, but the invention can be suitably applied to other types of bearings such as a sliding bearing.

The arrangement position of the two-dimensional code is not limited to the axial end surface, the inner peripheral surface, and the outer peripheral surface of the bearing, and when there is another surface such as a chamfer portion which can be easily detected, the code can be placed on that surface.

When the bearing component is provided with both the two-dimensional code and the character marking, the code and the character marking may be provided at positions where the code and the character marking do not overlap each other. When the two-dimensional code is provided on one of the axial end surfaces of the bearing component, the character marking may be provided on the other axial end surface and the other axial end surface may be used as a sliding surface for transportation on the production line.

As described above, the following matters are disclosed in the specification.

(1) A bearing component which is an annular member with a two-dimensional code which has a shape with a maximum circumferential dimension longer than a maximum radial dimension or a maximum axial dimension.

The bearing component makes it easier to read the two-dimensional code. For example, it is easy to assign the individual identification information to all bearing components mass-produced with the two-dimensional code and manage each bearing component individually.

(2) The bearing component according to (1), where at least one dot row among a plurality of dot rows arranged in a longitudinal direction of the two-dimensional code has a line pattern in which all dots are marked.

According to the bearing component, by detecting the position and orientation of the two-dimensional code based on the line pattern, the two-dimensional code can be reliably detected and the code content can be read accurately.

(3) The bearing component according to (2), where an extension direction of the line pattern coincides with a tangential direction of a circumference of the annular member.

According to the bearing component, when the bearing component is rotated around an axis, the line pattern continues to be placed at a specific radial position of the bearing component. As a result, it becomes easier to detect the two-dimensional code.

(4) The bearing component according to any one of (1) to (3), which has the two-dimensional code on an axial end surface.

According to the bearing component, by providing the two-dimensional code on one axial end surface and bringing the other axial end surface into contact with a mounting surface, stable two-dimensional code imaging is possible. As a result, it is possible to improve the detection and recognition accuracy of the two-dimensional code.

(5) The bearing component according to any one of (1) to (3), which has the two-dimensional code on an outer peripheral surface.

According to the bearing component, a placement space can be increased compared to the case where the two-dimensional code is provided on the axial end surface. As a result, larger two-dimensional codes can be provided.

(6) The bearing component according to any one of (1) to (5), where the two-dimensional code is provided at a plurality of locations along a circumferential direction of the annular member.

According to the bearing component, the two-dimensional code can be easily detected as compared with the case where only one two-dimensional code is provided in the circumferential direction. As a result, the tact can be improved.

(7) The bearing component according to any one of (1) to (6), where the two-dimensional code is a laser marking engraved on a metal surface.

According to the bearing component, the two-dimensional code can be marked with high accuracy in a short time.

(8) The bearing component according to any one of (1) to (7), which is an outer ring or an inner ring of a rolling bearing.

According to the bearing component, the individual identification information can be given to the outer ring or the inner ring, and thus the outer ring and the inner ring can be managed individually.

(9) A bearing which includes the bearing component according to any one of (1) to (8).

(10) A machine which includes the bearing component according to any one of (1) to (8).

(11) A vehicle which includes the bearing component according to any one of (1) to (8).

According to the bearing, the machine, and the vehicle, quality control can be facilitated by giving the individual identification information to the bearing component.

(12) An individual identification method for a bearing component, including the steps of:

imaging a bearing component which is an annular member having a two-dimensional code having a shape with a maximum circumferential dimension longer than a maximum radial dimension or a maximum axial dimension and where at least one of a plurality of dot rows arranged in a longitudinal direction of the two-dimensional code is a line pattern where all dots are marked while rotating the bearing component in a circumferential direction;

detecting the line pattern of the two-dimensional code from an obtained captured image;

recognizing the two-dimensional code based on an extension direction of the detected line pattern;

extracting registration information corresponding to information of the two-dimensional code by referring to a database based on recognized information of the two-dimensional code; and identifying the bearing component according to the extracted registration information.

According to the individual identification method for the bearing component, the two-dimensional code of the bearing component can be easily and reliably detected, and thus highly accurate individual identification becomes possible.

(13) The individual identification method for the bearing component according to (12), where step of detecting the line pattern includes the steps of, first step of detecting a circumferential position of the bearing component in which the two-dimensional code is arranged from the captured image of the bearing component, second step of stopping rotation of the bearing component and imaging the circumferential position where the two-dimensional code of the bearing component is detected, and third step of detecting the line pattern from a captured image obtained in the second step.

In the individual identification method for the bearing component, the position of the two-dimensional code is detected in the first step and the position and orientation of the two-dimensional code is accurately detected in the second step. As a result, the process until the two-dimensional code is recognized can be performed accurately in a short time.

(14) A method for manufacturing a bearing, in which the bearing is manufactured by using the bearing component according to any one of (1) to (8).

(15) A method for manufacturing a machine, in which a machine is manufactured using the bearing component according to any one of (1) to (8).

(16) A method for manufacturing a vehicle, in which a vehicle is manufactured using the bearing component according to any one of (1) to (8).

According to the methods for manufacturing the bearing, the machine, and the vehicle, the individual identification information can be given to each bearing component, so that quality control in the manufacturing process and after product shipment can be easily performed.

(17) A method for reading the two-dimensional code included in the bearing component according to any one of (1) to (8), including the steps of:

first, imaging the bearing component;

second, detecting a circumferential position of the bearing component in which the two-dimensional code is arranged from a captured image of the bearing component;

third, capturing the circumferential position of the bearing component and acquiring a captured image of the two-dimensional code; and fourth, reading information of the two-dimensional code from the captured image of the two-dimensional code.

According to the method for reading the two-dimensional code, by detecting the circumferential position of the two-dimensional code from the captured image of the bearing component and then re-imaging the detected circumferential position, a more detailed captured image of the two-dimensional code can be obtained. As a result, the detection accuracy of the two-dimensional code can be improved.

(18) The method for reading the two-dimensional code according to (17), where in the first step, the bearing component is rotated to image a plurality of different locations in a circumferential direction of the bearing component, and in the second step, the circumferential position of the two-dimensional code is detected from one of the captured images in a captured image group obtained by imaging the plurality of locations.

According to the method for reading the two-dimensional code, the imaging position can be changed only by rotationally driving the bearing component, and thus the captured image of the two-dimensional code can be easily acquired.

(19) The method for reading the two-dimensional code according to (18), where the bearing component is stopped from rotating and imaged.

According to the method for reading the two-dimensional code, it is possible to acquire a captured image without blurring and improve the detection accuracy of the two-dimensional code.

(20) The method for reading the two-dimensional code according to (18), where the bearing component is imaged while being rotated.

According to the method for reading the two-dimensional code, the imaging time can be shortened and the code reading tact time can be shortened.

(21) The method for reading the two-dimensional code according to (17), where in the first step, the imaging optical system for imaging the bearing component is moved to image a plurality of different locations in a circumferential direction of the bearing component, and in the second step, the circumferential position of the two-dimensional code is detected from one of captured images in a captured image group obtained by imaging the plurality of locations.

According to the method for reading the two-dimensional code, by moving the imaging optical system, the orientation of imaging can be adjusted in addition to the imaging position, and thus it becomes easy to obtain the captured image suitable for reducing arithmetic processing.

(22) The method for reading the two-dimensional code according to (21), where in the first step, the imaging optical system is stopped to take an image.

According to the method for reading the two-dimensional code, it is possible to acquire a captured image without blurring and improve the detection accuracy of the two-dimensional code.

(23) The method for reading the two-dimensional code according to (22), where an image is taken while moving the imaging optical system.

According to the method for reading the two-dimensional code, the imaging time can be shortened and the code reading tact time can be shortened.

(24) The method for reading the two-dimensional code according to any one of (18) to (23), where in the first step, a plurality of imaging optical systems for imaging the bearing component are used to image a plurality of different locations in the circumferential direction of the bearing component.

According to the method for reading the two-dimensional code, different locations can be simultaneously imaged by the plurality of imaging optical systems, and thus the plurality of captured images can be efficiently acquired in a short time.

(25) The method for reading the two-dimensional code according to any one of (18) to (24), where when the plurality of locations of the bearing component are sequentially imaged, when the two-dimensional code is detected in the captured image obtained by imaging, imaging after the imaging location of the captured image is stopped.

According to the method for reading the two-dimensional code, unnecessary imaging can be omitted, so that the tact time for two-dimensional code detection can be shortened.

(26) The method for reading the two-dimensional code according to (17), where in the first step, a plurality of locations of the bearing component are imaged by a plurality of imaging optical systems which respectively image a plurality of different locations in a circumferential direction of the stationary bearing component, and in the second step, the circumferential position of the two-dimensional code is detected from one of captured images in a captured image group obtained by imaging the plurality of locations.

According to the method for reading the two-dimensional code, the plurality of imaging optical systems can measure a plurality of locations of stationary receiving parts at a time, and thus a plurality of captured images can be efficiently acquired in a short time. There is no need to use a moving mechanism of the bearing component and the imaging optical system, which simplifies control.

(27) The method for reading the two-dimensional code according to (26), where the plurality of imaging optical systems are arranged at equal intervals in the circumferential direction of the bearing component.

According to the method for reading the two-dimensional code, a wide range can be efficiently imaged.

(28) The method for reading the two-dimensional code according to (17), where in the first step, the entire bearing component is imaged in a state where the bearing component is stationary.

According to the method for reading the two-dimensional code, it is possible to acquire an image without blurring and improve the detection accuracy of the two-dimensional code.

(29) The method for reading the two-dimensional code according to any one of (17) to (28), where in the third step, the bearing component is rotated so that the detected circumferential position of the two-dimensional code is arranged at an imaging position of the two-dimensional code.

According to the method for reading the two-dimensional code, the two-dimensional code can be easily and accurately placed at the imaging position by rotating the bearing component.

(30) The method for reading the two-dimensional code according to any one of (17) to (28), where in the third step, the imaging optical system which images the bearing component is moved so that the detected circumferential position of the two-dimensional code is arranged at an imaging position of the two-dimensional code.

According to the method for reading the two-dimensional code, the imaging optical system can be quickly placed at the imaging position of the two-dimensional code, and thus the tact time can be shortened.

(31) A method for reading the two-dimensional code included in the bearing component according to any one of (1) to (8), the method including:

imaging the bearing component, and reading information of the two-dimensional code from the captured image of the bearing component.

According to the method for reading the two-dimensional code, the bearing part can be easily identified by reading the two-dimensional code of the bearing part.

(32) The method for reading the two-dimensional code according to (31), where the information of the two-dimensional code is read from one of captured images of a captured image group obtained by rotating the bearing component and imaging a plurality of different locations in the circumferential direction of the bearing component.

According to the method for reading the two-dimensional code, from the captured image group obtained by moving the bearing component along the circumferential direction, the captured image in which the two-dimensional code is captured can be extracted and the two-dimensional code can be read from the extracted captured image.

(33) The method for reading the two-dimensional code according to (31), where the information of the two-dimensional code is read from one of captured images of a captured image group obtained by moving an imaging optical system for imaging the bearing component and imaging a plurality of different locations in the circumferential direction of the bearing component.

According to the method for reading the two-dimensional code, from the captured image group obtained by moving the imaging optical system, the captured image in which the two-dimensional code is captured can be extracted and the two-dimensional code can be read from the extracted captured image.

(34) The method for reading the two-dimensional code according to (32) or (33), where when a plurality of locations of the bearing component are sequentially imaged, when information of the two-dimensional code is read from a captured image obtained by imaging, imaging after the imaging location of the captured image is stopped.

According to the method for reading the two-dimensional code, unnecessary imaging can be omitted, so that the tact time for two-dimensional code detection can be shortened.

(35) The method for reading the two-dimensional code according to (31), where a plurality of locations of the bearing component are imaged by a plurality of imaging optical systems which image a plurality of different locations in the circumferential direction of the bearing component, and a circumferential position of the two-dimensional code is detected from one of captured images in a captured image group obtained by imaging the plurality of locations.

According to the method for reading the two-dimensional code, the plurality of imaging optical systems can image the plurality of different locations of the bearing component at a time, and thus the plurality of captured images can be efficiently acquired in a short time.

(36) The method for reading the two-dimensional code according to (35), where the plurality of imaging optical systems are arranged at equal intervals in the circumferential direction of the bearing component.

According to the method for reading the two-dimensional code, a wide range can be efficiently imaged.

(37) The method for reading the two-dimensional code according to (35) or (36), where when information of the two-dimensional code can be read from an image captured by at least one of the plurality of imaging optical systems, a reading process of the captured image by the imaging optical systems other than the imaging optical system is canceled.

According to the method for reading the two-dimensional code, unnecessary reading processing can be omitted, so that the calculation load for reading can be reduced and the tact time for two-dimensional code detection can be shortened.

This application is based on the Japanese patent application (Japanese Patent Application No. 2019-12189) filed on Jan. 28, 2019, the contents of which are incorporated herein by reference.

REFERENCE SIGNS LIST

11: inner ring (bearing component)
11a: raceway groove (guide surface)
11b: axial end surface
13: outer ring (bearing component)
13a: raceway groove (guide surface)
13b: axial end surface
23: line pattern
27: alignment pattern
100: rolling bearing (bearing)
DB: database
M: two-dimensional code
T: tangential direction
W: workpiece (bearing component)

The invention claimed is:

1. A method for reading a two-dimensional code included in a bearing component which is an annular member with the two-dimensional code which has a shape with a maximum circumferential dimension longer than a maximum radial dimensional, wherein the two dimensional code is provided on a flat part of the annular member, and at least one dot row among a plurality of dot rows arranged in a longitudinal direction of the two-dimensional code has a line pattern in which all dots are marked, the method comprising the steps of:
first, imaging the bearing component;
second, detecting a circumferential position of the bearing component in which the two-dimensional code is arranged from a captured image of the bearing component;
third, capturing the circumferential position of the bearing component and acquiring a captured image of the two-dimensional code; and
fourth, reading information of the two-dimensional code from the captured image of the two-dimensional code, wherein
in the first step, the bearing component is rotated to image a plurality of different locations in a circumferential direction of the bearing component, and
in the second step, the circumferential position of the two-dimensional code is detected from one of the captured images in a captured image group obtained by imaging the plurality of locations.

2. A method for manufacturing a bearing, wherein the bearing is manufactured by using the bearing component according to claim 1.

3. A method for manufacturing a machine, wherein a machine is manufactured using the bearing component according to claim 1.

4. A method for manufacturing a vehicle, wherein a vehicle is manufactured using the bearing component according to claim 1.

5. The method for reading the two-dimensional code according to claim 1, wherein the bearing component is stopped from rotating and imaged.

6. The method for reading the two-dimensional code according to claim 1, wherein the bearing component is imaged while being rotated.

7. The method for reading the two-dimensional code according to claim 1, wherein in the first step, a plurality of imaging optical systems for imaging the bearing component are used to image a plurality of different locations in the circumferential direction of the bearing component.

8. The method for reading the two-dimensional code according to claim 1, wherein when the plurality of locations of the bearing component are sequentially imaged, when the two-dimensional code is detected in the captured image obtained by imaging, imaging after the imaging location of the captured image is stopped.

9. The method for reading the two-dimensional code according to claim 1, wherein in the third step, the bearing component is rotated so that the detected circumferential position of the two-dimensional code is arranged at an imaging position of the two-dimensional code.

10. The method for reading the two-dimensional code according to claim 1, wherein in the third step, the imaging optical system which images the bearing component is moved so that the detected circumferential position of the two-dimensional code is arranged at an imaging position of the two-dimensional code.

11. A method for reading a two-dimensional code included in a bearing component which is an annular member with the two-dimensional code which has a shape with a maximum circumferential dimension longer than a maximum radial dimensional, wherein the two dimensional code is provided on a flat part of the annular member, and at least one dot row among a plurality of dot rows arranged in a longitudinal direction of the two-dimensional code has a line pattern in which all dots are marked, the method comprising the steps of:
first, imaging the bearing component;
second, detecting a circumferential position of the bearing component in which the two-dimensional code is arranged from a captured image of the bearing component;
third, capturing the circumferential position of the bearing component and acquiring a captured image of the two-dimensional code; and
fourth, reading information of the two-dimensional code from the captured image of the two-dimensional code, wherein
in the first step, the imaging optical system for imaging the bearing component is moved to image a plurality of different locations in a circumferential direction of the bearing component, and
in the second step, the circumferential position of the two-dimensional code is detected from one of the captured images in a captured image group obtained by imaging the plurality of locations.

12. The method for reading the two-dimensional code according to claim 11, wherein in the first step, an image is taken with a movement of the imaging optical system stopped.

13. The method for reading the two-dimensional code according to claim 11, wherein an image is taken while moving the imaging optical system.

14. A method for reading a two-dimensional code included in a bearing component which is an annular member with the two-dimensional code which has a shape with a maximum circumferential dimension longer than a maximum radial dimensional, wherein the two dimensional code is provided on a flat part of the annular member, and at least one dot row among a plurality of dot rows arranged in a longitudinal direction of the two-dimensional code has a line pattern in which all dots are marked, the method comprising the steps of:
first, imaging the bearing component;
second, detecting a circumferential position of the bearing component in which the two-dimensional code is arranged from a captured image of the bearing component;

third, capturing the circumferential position of the bearing component and acquiring a captured image of the two-dimensional code; and fourth, reading information of the two-dimensional code from the captured image of the two-dimensional code, wherein in the first step, a plurality of locations of the bearing component are imaged by a plurality of imaging optical system which respectively image a plurality of different locations in a circumferential direction of the stationary bearing component, and in the second step, the circumferential position of the two-dimensional code is detected from one of captured images in a captured image group obtained by imaging the plurality of locations.

15. The method for reading the two-dimensional code according to claim 14, wherein the plurality of imaging optical systems are arranged at equal intervals in the circumferential direction of the bearing component.

16. A method for reading a two-dimensional code included in a bearing component which is an annular member with the two-dimensional code which has a shape with a maximum circumferential dimension longer than a maximum radial dimensional, wherein the two dimensional code is provided on a flat part of the annular member, and at least one dot row among a plurality of dot rows arranged in a longitudinal direction of the two-dimensional code has a line pattern in which all dots are marked, the method comprising:

imaging the bearing component, and reading information of the two-dimensional code from the captured image of the bearing component, wherein the information of the two-dimensional code is read from one of captured images of a captured image group obtained by rotating the bearing component and imaging a plurality of different locations in the circumferential direction of the bearing component.

17. The method for reading the two-dimensional code according to claim 16, wherein when a plurality of locations of the bearing component are sequentially imaged, when information of the two-dimensional code is read from a captured image obtained by imaging, imaging after the imaging location of the captured image is stopped.

18. A method for reading a two-dimensional code included in a bearing component which is an annular member with the two-dimensional code which has a shape with a maximum circumferential dimension longer than a maximum radial dimensional, wherein the two dimensional code is provided on a flat part of the annular member, and at least one dot row among a plurality of dot rows arranged in a longitudinal direction of the two-dimensional code has a line pattern in which all dots are marked, the method comprising:

imaging the bearing component, and reading information of the two-dimensional code from the captured image of the bearing component, wherein the information of the two-dimensional code is read from one of captured images of a captured image group obtained by moving an imaging optical system for imaging the bearing component and imaging a plurality of different locations in the circumferential direction of the bearing.

19. A method for reading a two-dimensional code included in a bearing component which is an annular member with the two-dimensional code which has a shape with a maximum circumferential dimension longer than a maximum radial dimensional, wherein the two dimensional code is provided on a flat part of the annular member, and at least one dot row among a plurality of dot rows arranged in a longitudinal direction of the two-dimensional code has a line pattern in which all dots are marked, the method comprising:

imaging the bearing component, and reading information of the two-dimensional code from the captured image of the bearing component, wherein a plurality of locations of the bearing component are imaged by a plurality of imaging optical system which image a plurality of different locations in the circumferential direction of the bearing component, and a circumferential position of the two-dimensional code is detected from one of captured images in a captured image group obtained by imaging the plurality of locations.

20. The method for reading the two-dimensional code according to claim 19, wherein the plurality of imaging optical systems are arranged at equal intervals in the circumferential direction of the bearing component.

21. The method for reading the two-dimensional code according to claim 19, wherein when information of the two-dimensional code can be read from an image captured by at least one of the plurality of imaging optical systems, a reading process of the captured image by the imaging optical systems other than the imaging optical system is canceled.

22. A method for reading a two-dimensional code included in a bearing component which is an annular member with the two-dimensional code which has a shape with a maximum circumferential dimension longer than a maximum radial dimensional or a maximum axial dimension, the method comprising the steps of:

first, imaging the bearing component;

second, detecting a circumferential position of the bearing component in which the two-dimensional code is arranged from a captured image of the bearing component;

third, capturing the circumferential position of the bearing component and acquiring a captured image of the two-dimensional code; and fourth, reading information of the two-dimensional code from the captured image of the two-dimensional code, wherein, in the first step, the bearing component is rotated.

* * * * *